US012562822B2

(12) United States Patent
Liu et al.

(10) Patent No.: US 12,562,822 B2
(45) Date of Patent: Feb. 24, 2026

(54) USER EQUIPMENT MEASUREMENT AND REPORTING

(71) Applicant: QUALCOMM Incorporated, San Diego, CA (US)

(72) Inventors: Le Liu, San Jose, CA (US); Umesh Phuyal, San Diego, CA (US); Chiranjib Saha, San Diego, CA (US); Alberto Rico Alvarino, San Diego, CA (US); Masato Kitazoe, Tokyo (JP); Changhwan Park, San Diego, CA (US); Peter Gaal, San Diego, CA (US); Wanshi Chen, San Diego, CA (US); Xiao Feng Wang, San Diego, CA (US); Bharat Shrestha, San Diego, CA (US); Sitaramanjaneyulu Kanamarlapudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 716 days.

(21) Appl. No.: 17/810,146

(22) Filed: Jun. 30, 2022

(65) Prior Publication Data

US 2024/0007203 A1    Jan. 4, 2024

(51) Int. Cl.
| | |
|---|---|
| *H04W 4/00* | (2018.01) |
| *H04B 17/20* | (2015.01) |
| *H04B 17/309* | (2015.01) |
| *H04W 4/02* | (2018.01) |
| *H04W 24/10* | (2009.01) |

(52) U.S. Cl.
CPC ........... *H04B 17/20* (2015.01); *H04B 17/309* (2015.01); *H04W 4/027* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 2017/0251391 | A1* | 8/2017 | Kinthada Venkata | ...................... H04W 36/0088 |
| 2018/0123648 | A1* | 5/2018 | Nagaraja | ................ H04B 17/15 |
| 2019/0077508 | A1* | 3/2019 | Shimezawa | .......... G05D 1/0011 |
| 2019/0306675 | A1 | 10/2019 | Xue et al. | |
| 2019/0357066 | A1 | 11/2019 | Kim et al. | |
| 2020/0245208 | A1* | 7/2020 | Tsuda | ................... H04W 36/302 |
| 2020/0280820 | A1* | 9/2020 | Zhang | ................... G01S 5/0244 |
| 2020/0359234 | A1 | 11/2020 | Maattanen et al. | |
| 2020/0413267 | A1 | 12/2020 | Xue et al. | |

(Continued)

OTHER PUBLICATIONS

International Search Report and Written Opinion—PCT/US2023/023297—ISA/EPO—Sep. 18, 2023.

*Primary Examiner* — Abdelillah Elmejjarmi
(74) *Attorney, Agent, or Firm* — Harrity & Harrity, LLP

(57) ABSTRACT

Various aspects of the present disclosure generally relate to wireless communication. In some aspects, a user equipment (UE) may perform one or more measurements associated with an altitude of the UE. The UE may obtain an indication of an antenna condition or a flight path condition associated with the UE. The UE may transmit, based at least in part on the altitude of the UE being greater than an altitude threshold and at least one of the antenna condition or the flight path condition being satisfied, a measurement report that includes an indication of at least one of a location of the UE or a velocity of the UE. Numerous other aspects are described.

30 Claims, 16 Drawing Sheets

(56) References Cited

U.S. PATENT DOCUMENTS

| 2021/0007037 A1* | 1/2021 | Sharma | ............... | H04W 36/328 |
| 2022/0158702 A1 | 5/2022 | Nallampatti Ekambaram et al. | | |
| 2022/0330160 A1* | 10/2022 | Hwang | ............. | H04W 52/0274 |

* cited by examiner

905: Aerial UE with directional antennas

120

915

910

120

900: Aerial UE with omni-directional antennas

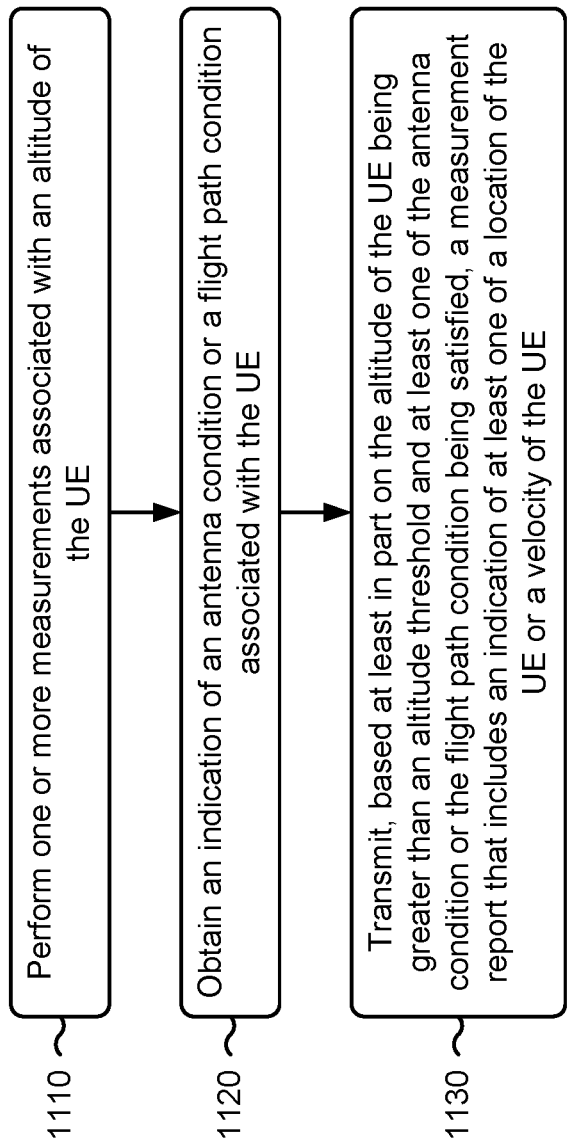

1100

1110 — Perform one or more measurements associated with an altitude of the UE

1120 — Obtain an indication of an antenna condition or a flight path condition associated with the UE 1130 — Transmit, based at least in part on the altitude of the UE being greater than an altitude threshold and at least one of the antenna condition or the flight path condition being satisfied, a measurement report that includes an indication of at least one of a location of the UE or a velocity of the UE

FIG. 11

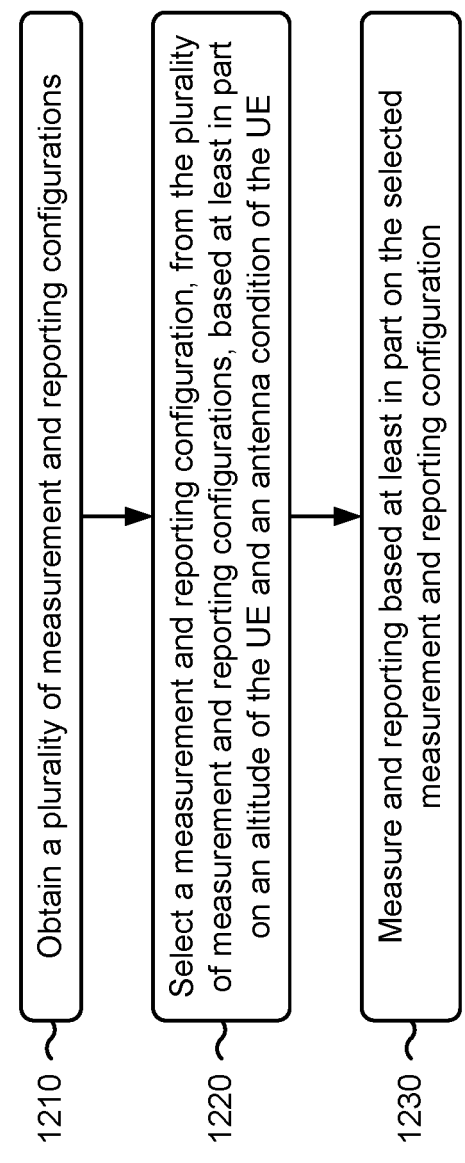

1200

1210 — Obtain a plurality of measurement and reporting configurations

1220 — Select a measurement and reporting configuration, from the plurality of measurement and reporting configurations, based at least in part on an altitude of the UE and an antenna condition of the UE 1230 — Measure and reporting based at least in part on the selected measurement and reporting configuration

FIG. 12

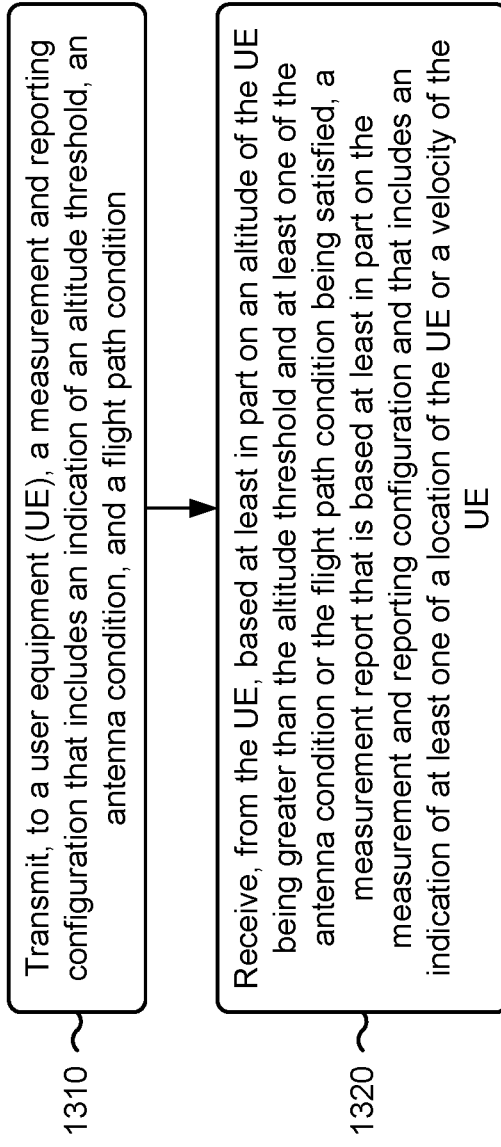

1310 — Transmit, to a user equipment (UE), a measurement and reporting configuration that includes an indication of an altitude threshold, an antenna condition, and a flight path condition 1320 — Receive, from the UE, based at least in part on an altitude of the UE being greater than the altitude threshold and at least one of the antenna condition or the flight path condition being satisfied, a measurement report that is based at least in part on the measurement and reporting configuration and that includes an indication of at least one of a location of the UE or a velocity of the UE

1410 — Transmit, to a UE, a plurality of measurement and reporting configurations 1420 — Receive, from the UE, an indication of a selected measurement and reporting configuration, of the plurality of measurement and reporting configurations, that is based at least in part on an altitude of the UE and an antenna condition of the UE

1400

USER EQUIPMENT MEASUREMENT AND REPORTING

FIELD OF THE DISCLOSURE

Aspects of the present disclosure generally relate to wireless communication and to techniques and apparatuses for user equipment measurement and reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include performing one or more measurements associated with an altitude of the UE. The method may include obtaining an indication of an antenna condition or a flight path condition associated with the UE. The method may include transmitting, based at least in part on the altitude of the UE being greater than an altitude threshold and at least one of the antenna condition or the flight path condition being satisfied, a measurement report that includes an indication of at least one of a location of the UE or a velocity of the UE.

Some aspects described herein relate to a method of wireless communication performed by a UE. The method may include obtaining a plurality of measurement and reporting configurations. The method may include selecting a measurement and reporting configuration, from the plurality of measurement and reporting configurations, based at least in part on an altitude of the UE and an antenna condition of the UE. The method may include measuring and reporting based at least in part on the selected measurement and reporting configuration.

Some aspects described herein relate to a method of wireless communication performed by a network node. The method may include transmitting, to a UE, a measurement and reporting configuration that includes an indication of an altitude threshold, an antenna condition, and a flight path condition. The method may include receiving, from the UE, based at least in part on an altitude of the UE being greater than the altitude threshold and at least one of the antenna condition or the flight path condition being satisfied, a measurement report that is based at least in part on the measurement and reporting configuration and that includes an indication of at least one of a location of the UE or a velocity of the UE.

Some aspects described herein relate to a method of wireless communication performed by a network node. The method may include transmitting, to a UE, a plurality of measurement and reporting configurations. The method may include receiving, from the UE, an indication of a selected measurement and reporting configuration, of the plurality of measurement and reporting configurations, that is based at least in part on an altitude of the UE and an antenna condition of the UE.

Some aspects described herein relate to an apparatus for wireless communication performed by a UE. The apparatus may include a memory and one or more processors, coupled to the memory. The one or more processors may be configured to perform one or more measurements associated with an altitude of the UE. The one or more processors may be configured to obtain an indication of an antenna condition or a flight path condition associated with the UE. The one or more processors may be configured to transmit, based at least in part on the altitude of the UE being greater than an altitude threshold and at least one of the antenna condition or the flight path condition being satisfied, a measurement report that includes an indication of at least one of a location of the UE or a velocity of the UE.

Some aspects described herein relate to an apparatus for wireless communication performed by a UE. The apparatus may include a memory and one or more processors, coupled to the memory. The one or more processors may be configured to obtain a plurality of measurement and reporting configurations. The one or more processors may be configured to select a measurement and reporting configuration, from the plurality of measurement and reporting configurations, based at least in part on an altitude of the UE and an antenna condition of the UE. The one or more processors may be configured to measure and report based at least in part on the selected measurement and reporting configuration.

Some aspects described herein relate to an apparatus for wireless communication performed by a network node. The apparatus may include a memory and one or more processors, coupled to the memory. The one or more processors may be configured to transmit, to a UE, a measurement and reporting configuration that includes an indication of an altitude threshold, an antenna condition, and a flight path condition. The one or more processors may be configured to receive, from the UE, based at least in part on an altitude of the UE being greater than the altitude threshold and at least one of the antenna condition or the flight path condition being satisfied, a measurement report that is based at least in part on the measurement and reporting configuration and that includes an indication of at least one of a location of the UE or a velocity of the UE.

Some aspects described herein relate to an apparatus for wireless communication performed by a network node. The apparatus may include a memory and one or more processors, coupled to the memory. The one or more processors may be configured to transmit, to a UE, a plurality of measurement and reporting configurations. The one or more processors may be configured to receive, from the UE, an indication of a selected measurement and reporting configuration, of the plurality of measurement and reporting configurations, that is based at least in part on an altitude of the UE and an antenna condition of the UE.

Some aspects described herein relate to a non-transitory computer-readable medium that stores a set of instructions for wireless communication by a UE. The set of instructions, when executed by one or more processors of the UE, may cause the UE to perform one or more measurements associated with an altitude of the UE. The set of instructions, when executed by one or more processors of the UE, may cause the UE to obtain an indication of an antenna condition or a flight path condition associated with the UE. The set of instructions, when executed by one or more processors of the UE, may cause the UE to transmit, based at least in part on the altitude of the UE being greater than an altitude threshold and at least one of the antenna condition or the flight path condition being satisfied, a measurement report that includes an indication of at least one of a location of the UE or a velocity of the UE.

Some aspects described herein relate to a non-transitory computer-readable medium that stores a set of instructions for wireless communication by a UE. The set of instructions, when executed by one or more processors of the UE, may cause the UE to obtain a plurality of measurement and reporting configurations. The set of instructions, when executed by one or more processors of the UE, may cause the UE to select a measurement and reporting configuration, from the plurality of measurement and reporting configurations, based at least in part on an altitude of the UE and an antenna condition of the UE. The set of instructions, when executed by one or more processors of the UE, may cause the UE to measure and report based at least in part on the selected measurement and reporting configuration.

Some aspects described herein relate to a non-transitory computer-readable medium that stores a set of instructions for wireless communication by a network node. The set of instructions, when executed by one or more processors of the network node, may cause the network node to transmit, to a UE, a measurement and reporting configuration that includes an indication of an altitude threshold, an antenna condition, and a flight path condition. The set of instructions, when executed by one or more processors of the network node, may cause the network node to receive, from the UE, based at least in part on an altitude of the UE being greater than the altitude threshold and at least one of the antenna condition or the flight path condition being satisfied, a measurement report that is based at least in part on the measurement and reporting configuration and that includes an indication of at least one of a location of the UE or a velocity of the UE.

Some aspects described herein relate to a non-transitory computer-readable medium that stores a set of instructions for wireless communication by a network node. The set of instructions, when executed by one or more processors of the network node, may cause the network node to transmit, to a UE, a plurality of measurement and reporting configurations. The set of instructions, when executed by one or more processors of the network node, may cause the network node to receive, from the UE, an indication of a selected measurement and reporting configuration, of the plurality of measurement and reporting configurations, that is based at least in part on an altitude of the UE and an antenna condition of the UE.

Some aspects described herein relate to an apparatus for wireless communication. The apparatus may include means for performing one or more measurements associated with an altitude of the apparatus. The apparatus may include means for obtaining an indication of an antenna condition or a flight path condition associated with the apparatus. The apparatus may include means for transmitting, based at least in part on the altitude of the apparatus being greater than an altitude threshold and at least one of the antenna condition or the flight path condition being satisfied, a measurement report that includes an indication of at least one of a location of the apparatus or a velocity of the apparatus.

Some aspects described herein relate to an apparatus for wireless communication. The apparatus may include means for obtaining a plurality of measurement and reporting configurations. The apparatus may include means for selecting a measurement and reporting configuration, from the plurality of measurement and reporting configurations, based at least in part on an altitude of the apparatus and an antenna condition of the apparatus. The apparatus may include means for measuring and reporting based at least in part on the selected measurement and reporting configuration.

Some aspects described herein relate to an apparatus for wireless communication. The apparatus may include means for transmitting, to a UE, a measurement and reporting configuration that includes an indication of an altitude threshold, an antenna condition, and a flight path condition. The apparatus may include means for receiving, from the UE, based at least in part on an altitude of the UE being greater than the altitude threshold and at least one of the antenna condition or the flight path condition being satisfied, a measurement report that is based at least in part on the measurement and reporting configuration and that includes an indication of at least one of a location of the UE or a velocity of the UE.

Some aspects described herein relate to an apparatus for wireless communication. The apparatus may include means for transmitting, to a UE, a plurality of measurement and reporting configurations. The apparatus may include means for receiving, from the UE, an indication of a selected measurement and reporting configuration, of the plurality of measurement and reporting configurations, that is based at least in part on an altitude of the UE and an antenna condition of the UE.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a diagram illustrating an example process performed, for example, by a UE, in accordance with the present disclosure.

FIG. 12 is a diagram illustrating an example process performed, for example, by a UE, in accordance with the present disclosure.

FIG. 13 is a diagram illustrating an example process performed, for example, by a network node, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
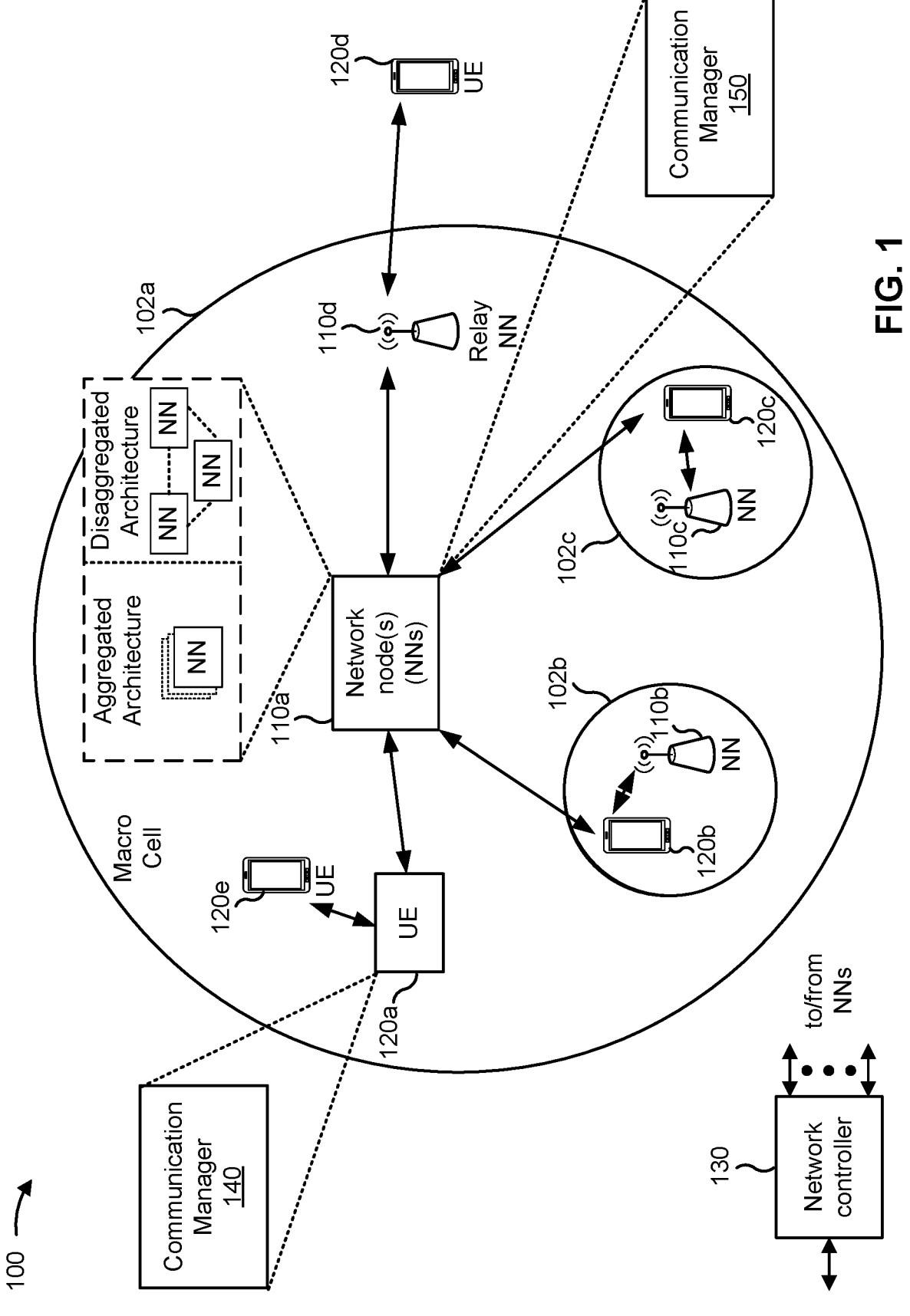
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform one or more measurements associated with an altitude of the UE; obtain an indication of an antenna condition or a flight path condition associated with the UE; and transmit, based at least in part on the altitude of the UE being greater than an altitude threshold and at least one of the antenna condition or the flight path condition being satisfied, a measurement report that includes an indication of at least one of a location of the UE or a velocity of the UE. Additionally, or alternatively, the communication manager 140 may perform one or more other operations described herein.

In some aspects, the communication manager 140 may obtain a plurality of measurement and reporting configurations; select a measurement and reporting configuration, from the plurality of measurement and reporting configurations, based at least in part on an altitude of the UE and an antenna condition of the UE; and measure and report based at least in part on the selected measurement and reporting configuration. Additionally, or alternatively, the communication manager 140 may perform one or more other operations described herein.

In some aspects, the network node 110 may include a communication manager 150. As described in more detail elsewhere herein, the communication manager 150 may transmit, to a UE, a measurement and reporting configuration that includes an indication of an altitude threshold, an antenna condition, and a flight path condition; and receive, from the UE, based at least in part on an altitude of the UE being greater than the altitude threshold and at least one of the antenna condition or the flight path condition being satisfied, a measurement report that is based at least in part on the measurement and reporting configuration and that includes an indication of at least one of a location of the UE or a velocity of the UE. Additionally, or alternatively, the communication manager 150 may perform one or more other operations described herein.

In some aspects, the communication manager 150 may transmit, to a UE, a plurality of measurement and reporting configurations; and receive, from the UE, an indication of a selected measurement and reporting configuration, of the plurality of measurement and reporting configurations, that is based at least in part on an altitude of the UE and an antenna condition of the UE. Additionally, or alternatively, the communication manager 150 may perform one or more other operations described herein.

As indicated above, FIG. 1 is provided as an example. Other examples may differ from what is described with regard to FIG. 1.

Figure 2:
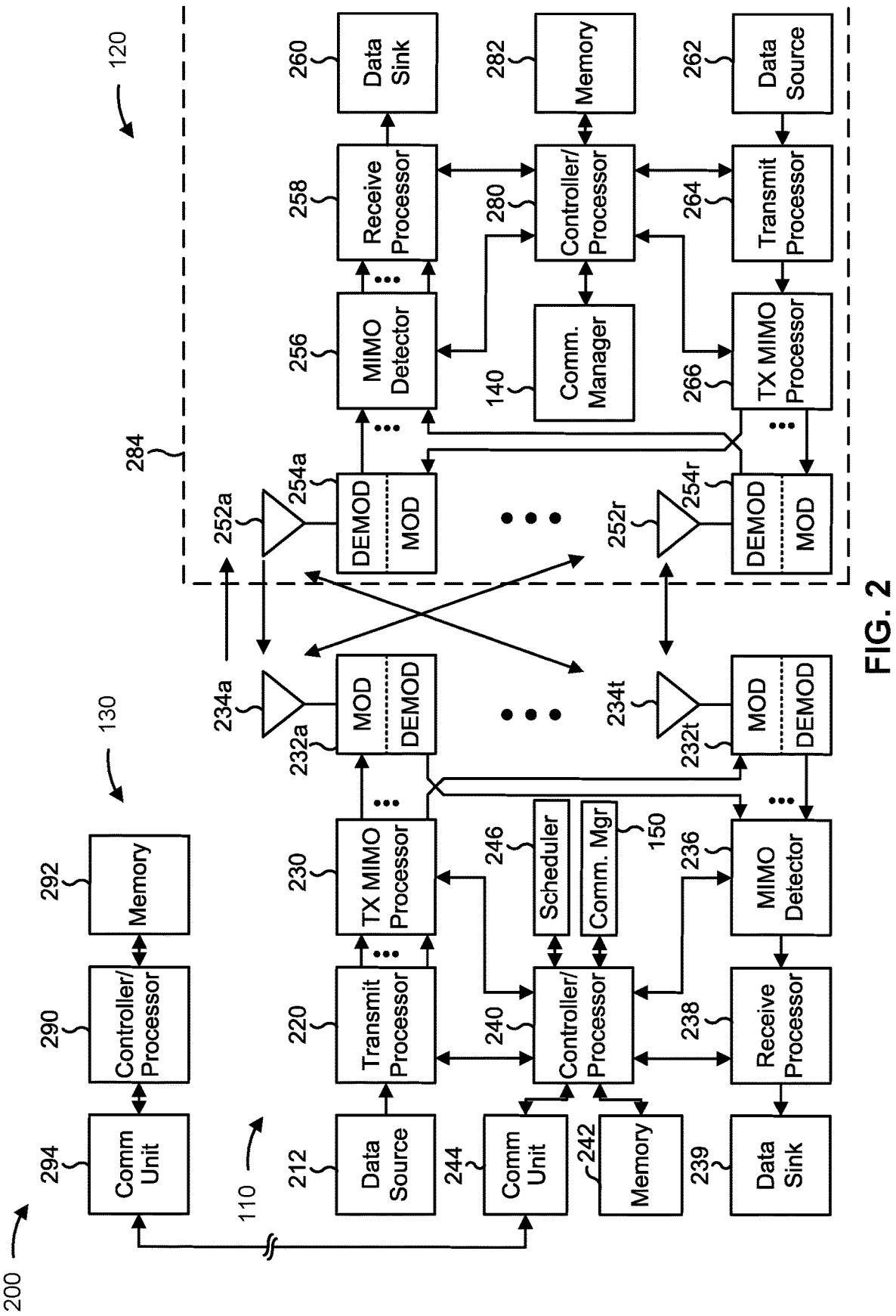
FIG. 2 is a diagram illustrating an example of a network node in communication with a user equipment (UE) in a wireless network, in accordance with the present disclosure.

FIG. 2 is a diagram illustrating an example 200 of a network node 110 in communication with a user equipment (UE) 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-16).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-16).

The controller/processor 240 of the network node 110, the controller/processor 280 of the UE 120, and/or any other component(s) of FIG. 2 may perform one or more techniques associated with UE measurement and reporting, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11, process 1200 of FIG. 12, process 1300 of FIG. 13, process 1400 of FIG. 14, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1100 of FIG. 11, process 1200 of FIG. 12, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, a UE (e.g., the UE 120) includes means for performing one or more measurements associated with an altitude of the UE; means for obtaining an indication of an antenna condition or a flight path condition associated with the UE; and/or means for transmitting, based at least in part on the altitude of the UE being greater than an altitude threshold and at least one of the antenna condition or the flight path condition being satisfied, a measurement report that includes an indication of at least one of a location of the UE or a velocity of the UE. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a UE (e.g., the UE 120) includes means for obtaining a plurality of measurement and reporting configurations; means for selecting a measurement and reporting configuration, from the plurality of measurement and reporting configurations, based at least in part on an altitude of the UE and an antenna condition of the UE; and/or means for measuring and reporting based at least in part on the selected measurement and reporting configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting, to a UE, a measurement and reporting configuration that includes an indication of an altitude threshold, an antenna condition, and a flight path condition; and/or means for receiving, from the UE, based at least in part on an altitude of the UE being greater than the altitude threshold and at least one of the antenna condition or the flight path condition being satisfied, a measurement report that is based at least in part on the measurement and reporting configuration and that includes an indication of at least one of a location of the UE or a velocity of the UE. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a network node (e.g., the network node 110) includes means for transmitting, to a UE, a plurality of measurement and reporting configurations; and/or means for receiving, from the UE, an indication of a selected measurement and reporting configuration, of the plurality of measurement and reporting configurations, that is based at least in part on an altitude of the UE and an antenna condition of the UE. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
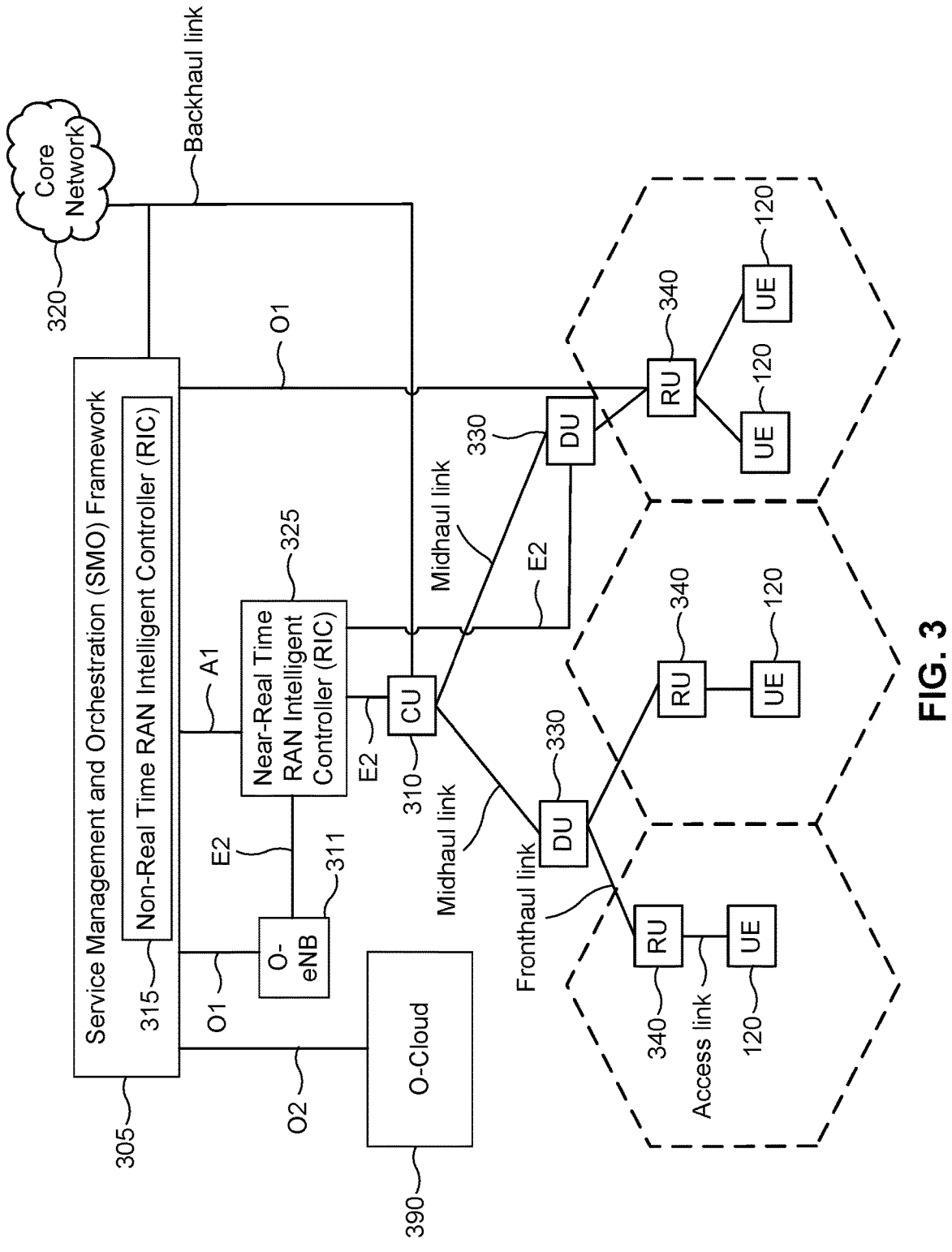
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the non-RT RIC 315 or the Near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
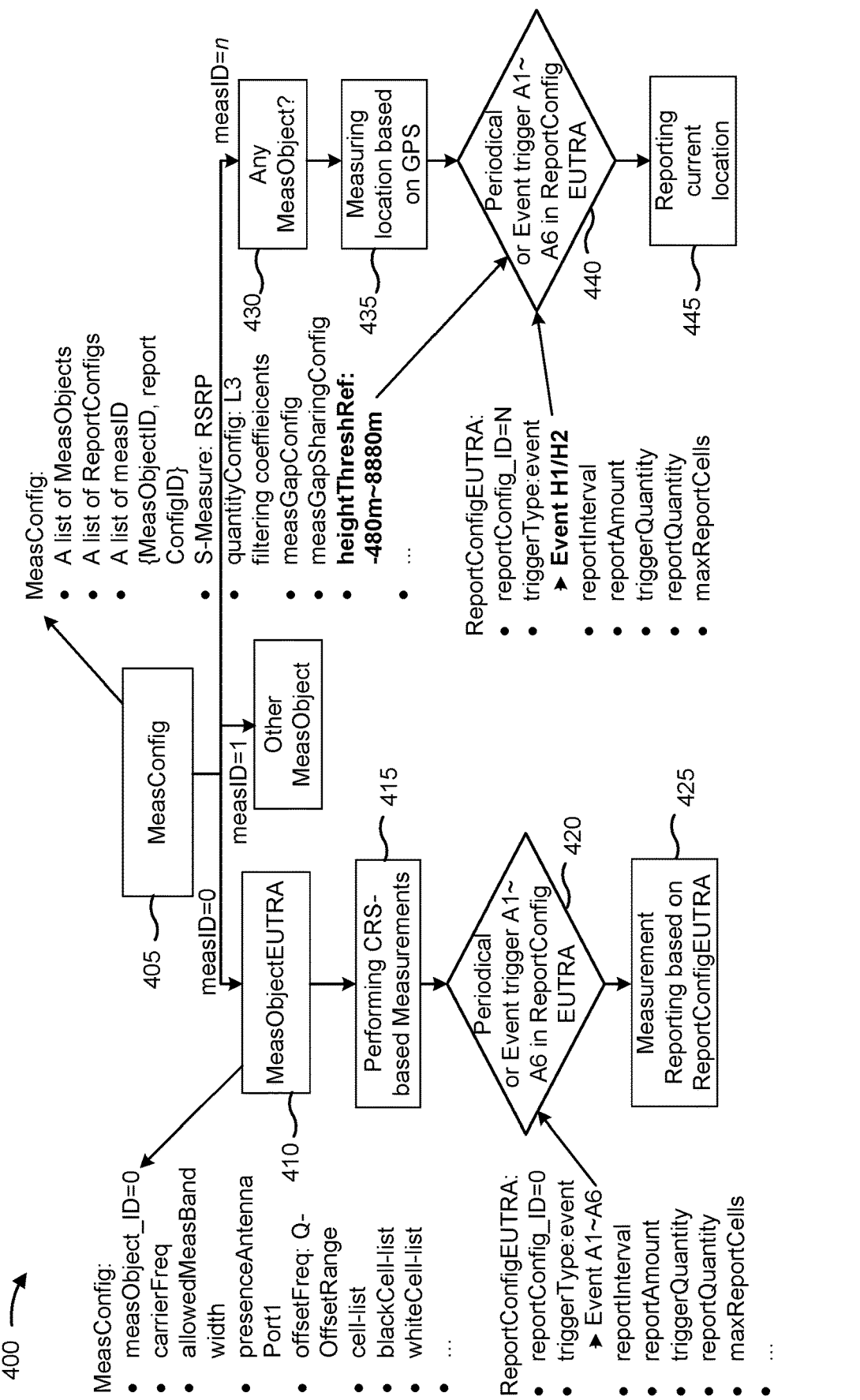
FIG. 4 is a diagram illustrating an example of a measurement and reporting configuration structure based at least in part on UE altitude, in accordance with the present disclosure.

FIG. 4 is a diagram illustrating an example 400 of a measurement and reporting configuration structure based at least in part on UE altitude, in accordance with the present disclosure. A measurement configuration 405 (MeasConfig) may include a list of measurement objects (MeasObjects), a list of reporting configurations (ReportConfigs), a list of measurement identities (measID) (as associated with a measurement object identifier (MeasObjectId) and a reporting configuration identifier (reportConfigId)), an s-measurement indication (S-Measure) (e.g., indicating RSRP), a quantity configuration indication (quantityConfig) (e.g., indicating L3 filtering coefficients), a measurement gap configuration indication (measGapConfig), a measurement gap sharing configuration indication (measGapSharingConfig), and/or a height threshold reference indication (heightThreshRef), among other examples. In some aspects, the height threshold reference indication may indicate a height threshold, such as an altitude threshold. For example, the altitude threshold may be an altitude that is between −480 meters and 8880 meters.

In some aspects, a first measID is associated with a first measurement object 410 for evolved universal terrestrial radio access (EUTRA) (MeasObjectUETRA) identified by a measurement object identifier indication (e.g., measObjectId=0) and a first reporting configuration for EUTRA (ReportConfigUETRA) identified by a reporting configuration identifier (e.g., reportConfigId=0). The MeasObjectUETRA may include a carrier frequency indication (carrierFreq), an allowed measurement bandwidth indication (allowedMeasBandwidth), an antenna port indication (presenceAntennaPort1), an offset frequency indication (offsetFreq), a cell list indication (cell-list), a black cell list indication (blackCell-list), and/or a white cell list indication (whiteCell-list), among other examples. As shown by reference number 415, the UE 120 may perform measurements, such as CRS-based measurements, for detecting one or more conditions or triggers.

As shown by reference number 420, the UE 120 may detect an occurrence of a periodic trigger or event trigger. For example, the UE 120 may detect that a serving cell quality has become better than a threshold (Event A1), a serving cell quality has become worse than a threshold (Event A2), a neighbor cell quality has become better than a special cell quality by an offset (Event A3), a neighbor cell quality has become better than a threshold (Event A4), a special cell quality has become worse than a threshold and a neighbor cell quality has become better than another threshold (Event A5), and/or that a neighbor cell quality has become better than a special cell quality by a threshold (Event A6). The thresholds for the plurality of event triggers may be the same thresholds or may be different thresholds. In some aspects, the reporting configuration (ReportConfigEUTRA) may include an indication of the trigger type (e.g., triggerType as "event" or "periodical"), a report interval indication (reportInterval), a report amount indication (reportAmount), a trigger quantity indication (triggerQuantity), a report quantity indication (reportQuantity), and/or a maximum number of reported cells indication (maxReportCells), among other examples. As shown by reference number 425, the UE 120 may perform measurement and reporting based at least in part on detecting the occurrence of one or more of the event triggers or conditions.

In some aspects, a second measID is associated with a second measurement object 430 for EUTRA identified by a measurement object identifier indication (e.g., measObjectId=n) and a second reporting configuration for EUTRA (ReportConfigUETRA) identified by a reporting configuration identifier (e.g., reportConfigId=n). As shown by reference number 435, the UE 120 may measure a location of the UE 120, such as a global positioning system (GPS) location of the UE 120. As shown by reference number 440, the UE 120 may detect whether a periodic trigger or event trigger has occurred (e.g., as described above in connection with reference number 420). In this case, the event trigger may include the UE 120 exceeding the altitude threshold (Event H1) or the UE 120 moving to an area that is within the altitude threshold (Event H2). In some aspects, the reporting configuration may include the reporting configuration identifier, the event indication, the report interval indication, the report amount indication, the trigger quantity indication, the report quantity indication, and/or the maximum number of reported cells indication, among other examples. In some aspects, the event indication may indicate whether the Event H1 or the Event H2 has occurred. As shown by reference number 445, the UE 120 may perform measurement and reporting based at least in part on detecting the occurrence of the event, such as the Event H1 or the Event H2. Additional details regarding this feature are described below in connection with FIG. 5.

As indicated above, FIG. 4 is provided as an example. Other examples may differ from what is described with regard to FIG. 4.

Figure 5:
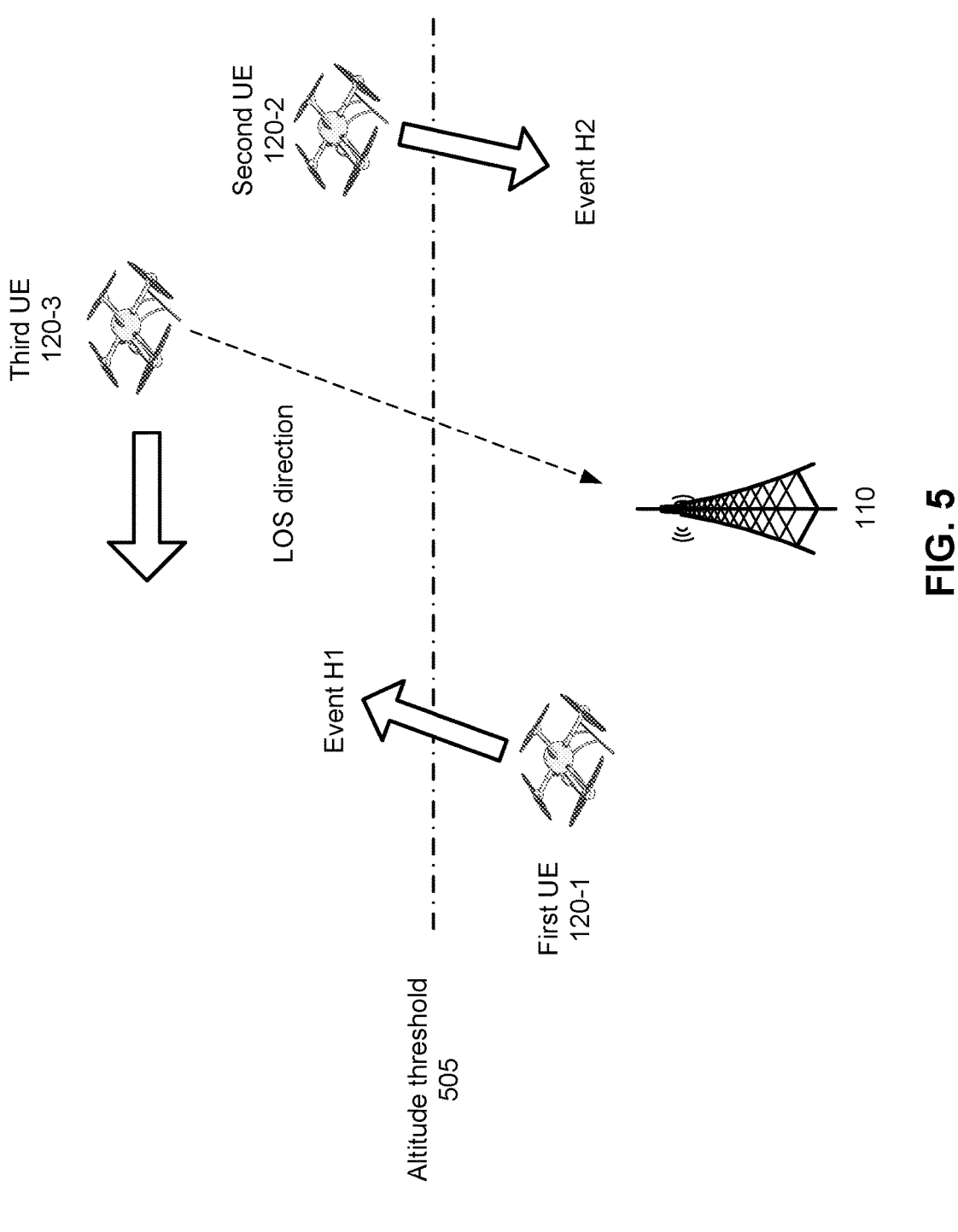
FIG. 5 is a diagram illustrating an example of measurement and reporting based at least in part on UE altitude, in accordance with the present disclosure.

FIG. 5 is a diagram illustrating an example 500 of measurement and reporting based at least in part on UE altitude, in accordance with the present disclosure. A first UE 120-1, a second UE 120-2, and a third UE 120-3 may communicate with the network node 110. The first UE 120-1, the second UE 120-2, and the third UE 120-3 may be aerial UEs, such as unmanned aerial vehicles (UAVs). The first UE 120-1, the second UE 120-2, and the third UE 120-3 may be configured to report information to the network node 110 based at least in part on crossing an altitude threshold 505. In some aspects, the network node 110 may be configured to detect early interference when one or more of UEs cross the altitude threshold and transmit a measurement report, as described below.

In a first example, the first UE 120-1 may cross the altitude threshold 505. For example, the first UE 120-1 may move from an area that is below the altitude threshold 505 to an area that is above the altitude threshold 505. The first UE 120-1 may transmit a measurement report to the network node 110 based at least in part on crossing the altitude threshold. In some aspects, the measurement report may indicate that the first UE 120-1 has crossed the altitude threshold and/or may indicate a location of the first UE 120-1.

In a second example, the second UE 120-2 may cross the altitude threshold 505. For example, the second UE 120-2 may move from an area that is above the altitude threshold 505 to an area that is below the altitude threshold 505. The second UE 120-2 may transmit a measurement report to the network node 110 based at least in part on crossing the altitude threshold. In some aspects, the measurement report may indicate that the second UE 120-2 has crossed the altitude threshold and/or may indicate a location of the second UE 120-2.

In a third example, the third UE 120-3 may not cross the altitude threshold 505. For example, the third UE 120-3 may move in a horizontal (and/or a vertical) direction that does not result in the third UE 120-3 crossing the altitude threshold 505. In this case, the third UE 120-3 may not transmit a measurement report to the network node 120-3, since the report triggering is based at least in part on the third UE 120-3 crossing the altitude threshold 505. The third UE 120-3 moving in a direction that does not cross the altitude threshold 505 and therefore not transmitting a measurement report associated with the UE measurements may not be desirable. For example, in some aspects, the third UE 120-3 may switch a directional antenna on or off, which may result in interference variation. If the network node 110 is not able to determine the location or the antenna configuration of the third UE 120-3, the network node 110 may not be able to perform beam management for the third UE 120-3. In another example, the third UE 120-3 may stray (e.g., travel away) from a flight path. However, since the third UE 120-3 is not reporting the location of the third UE 120-3 to the network node 110, the network node 110 may not be able to determine that the third UE 120-3 has strayed from the flight path. Therefore, the network node 110 may not transmit an indication that the third UE 120-3 has strayed from the flight path to one or more other network nodes. This may result in the movements of the third UE 120-3 being undetected and/or may result in the third UE 120-3 becoming disconnected from the network.

Techniques and apparatuses are described herein for UE measurement and reporting. In some aspects, a UE may perform one or more measurements associated with an altitude of the UE, and may obtain an indication of an antenna condition or a flight path condition associated with the UE. The UE may transmit, based at least in part on the altitude of the UE being greater than an altitude threshold and at least one of the antenna condition or the flight path condition being satisfied, a measurement report that includes an indication of a location of the UE and/or a velocity of the UE. In some aspects, the UE may obtain a plurality of measurement and reporting configurations. The UE may select a measurement and reporting configuration, from the plurality of measurement and reporting configurations, based at least in part on an altitude of the UE and an antenna condition of the UE, and may perform measuring and reporting based at least in part on the selected measurement and reporting configuration.

As described above, a UE that does not cross an altitude threshold may not be configured to transmit a measurement report to a network node. This may result in the network node not being able to perform beam management and/or the network node not being able to report that the UE has left a flight path. Using the techniques and apparatuses described herein, the UE may transmit a measurement report, that includes an indication of the location of the UE and/or the velocity of the UE, based at least in part on the altitude of the UE being greater than an altitude threshold and at least one of an antenna condition or a flight path condition being satisfied. This may enable the network node to more frequently receive measurement reports from the UE, and to perform beam management and UE location reporting more frequently, among other examples.

As indicated above, FIG. 5 is provided as an example. Other examples may differ from what is described with regard to FIG. 5.

Figure 6:
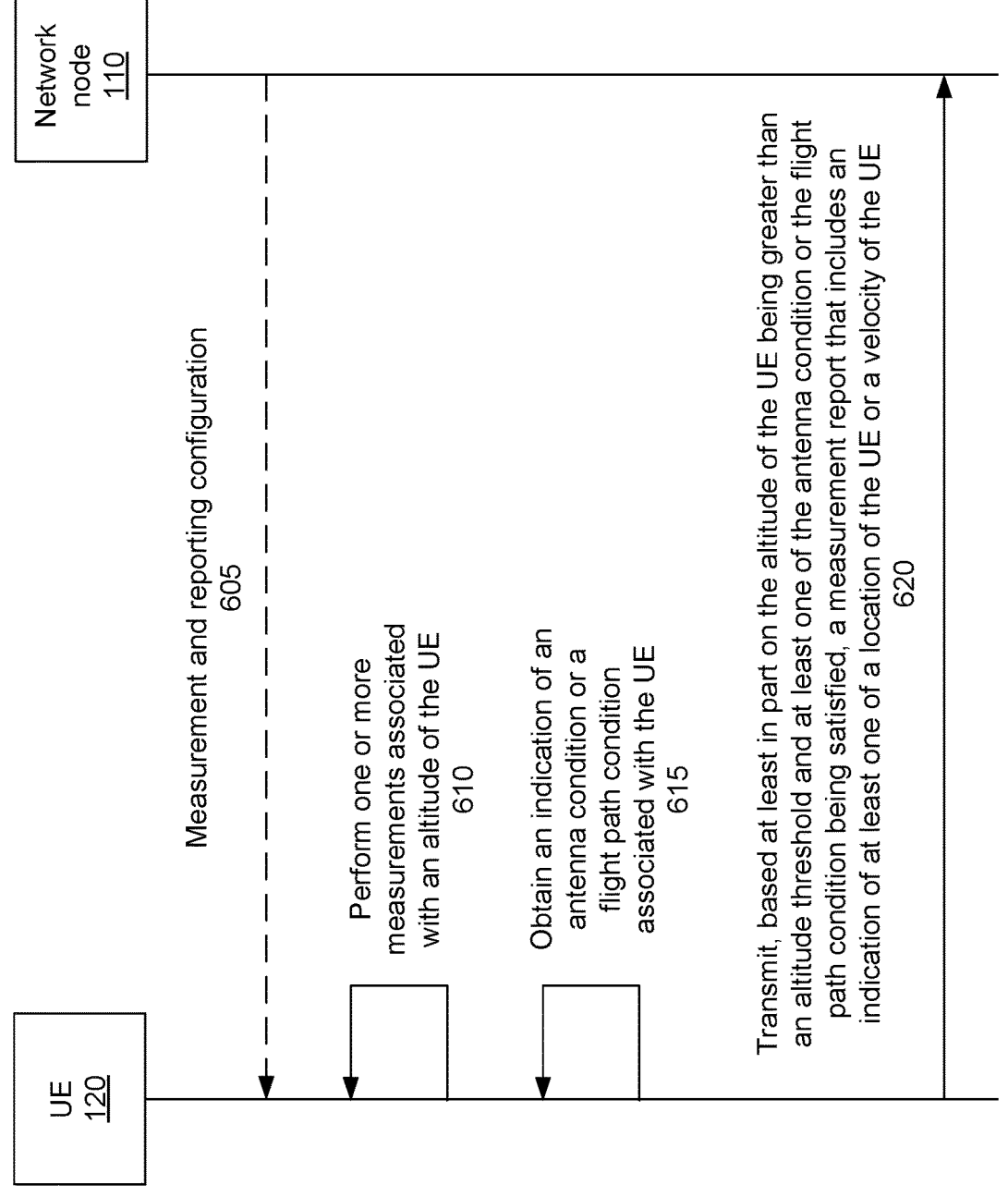
FIG. 6 is a diagram illustrating an example of UE measurement and reporting, in accordance with the present disclosure.

FIG. 6 is a diagram illustrating an example 600 of UE measurement and reporting, in accordance with the present disclosure.

As shown in connection with reference number 605, the network node 110 may transmit, and the UE 120 may receive, a measurement and reporting configuration. In some aspects, the measurement and reporting configuration may indicate an altitude threshold, such as the altitude threshold 505 described above. In some aspects, the measurement and reporting configuration may indicate one or more antenna conditions, such as an omni-directional antenna condition and a directional antenna condition. In some aspects, the measurement and reporting configuration may indicate one or more flight path conditions. Additional details regarding these features are described below.

As shown in connection with reference number 610, the UE 120 may perform one or more measurements associated with an altitude of the UE 120. In some aspects, the one or more measurements may include determining whether the UE 120 has crossed the altitude threshold. For example, the UE 120 may determine that the UE 120 has crossed the altitude threshold based at least in part on an indication that the UE 120 has moved from an area that is below the altitude threshold to an area that is above the altitude threshold, or based at least in part on an indication that the UE 120 has moved from an area that is above the altitude threshold to an area that is below the altitude threshold. In some aspects, the UE 120 moving from the area that is below the altitude threshold to the area that is above the altitude threshold may be referred to as a first event (e.g., Event H1), and the UE 120 moving from the area that is above the altitude threshold to the area that is below the altitude threshold may be referred to as a second event (e.g., Event H2). In another example, the UE 120 may determine that the UE 120 has not crossed the altitude threshold based at least in part on an indication that the UE 120 has stayed below the altitude threshold or based at least in part on an indication that the UE 120 has stayed above the altitude threshold.

As shown in connection with reference number 615, the UE 120 may obtain an indication of an antenna condition and/or a flight path condition associated with the UE 120. In some aspects, the UE 120 may be configured (e.g., pre-configured) with the antenna condition and/or the flight path condition. In some aspects, the UE 120 may receive the antenna condition and/or the flight path condition from the network node 110, such as via the measurement and reporting configuration described above. In some aspects, the antenna condition may indicate an omni-directional antenna condition and/or a directional antenna condition associated with the UE 120. For example, the omni-directional antenna condition may indicate that the UE 120 is using an omni-directional antenna and the directional antenna condition may indicate that the UE 120 is using a directional antenna. In some aspects, the flight path condition may indicate a flight path associated with the UE 120 and/or a reference location (e.g., a reference area) associated with the UE 120.

In some aspects, a third event (e.g., Event X1) may occur when the altitude of the UE 120 is greater than the altitude threshold and the UE 120 switches from the omni-directional antenna to the directional antenna. A fourth event (e.g., Event X2) may occur when the altitude of the UE 120 is greater than the altitude threshold and the UE 120 switches from the directional antenna to the omni-directional antenna. In some aspects, the UE 120 may be configured to initiate a directional beamforming based at least in part on an occurrence of the Event X1 or the event X2. In some aspects, a fifth event (e.g., Event Y1) may occur when the altitude of the UE 120 is greater than the altitude threshold and the UE 120 moves from an area that is within the reference location (e.g., the reference area) to an area that is outside of the reference location (e.g., when the flight path or the broadcasted location of the UE 120 is away from the reference location by Y>+/1 y-dB). A sixth event (e.g., Event Y2) may occur when the altitude of the UE 120 is greater than the altitude threshold and the UE 120 moves from an area that is outside of the reference location to an area that is within the reference location (e.g., when the flight path or the broadcasted location of the UE 120 is away from the reference point by Y<+/1 y-dB). In some aspects, the UE 120 may be configured to report a flight path based at least in part on an occurrence of the Event Y1 or the Event Y2.

As shown in connection with reference number 620, the UE 120 may transmit a measurement report that includes an indication of a location of the UE 120 and/or a velocity of the UE 120. The UE 120 may transmit the measurement report based at least in part on the altitude of the UE 120 being greater than an altitude threshold and at least one of the antenna condition or the flight path condition being satisfied. For example, the UE 120 may transmit the measurement report based at least in part on an occurrence of the Event H1, the Event H2, the Event X1, the Event X2, the Event Y1, and/or the Event Y2.

In some aspects, the measurement report may include location information associated with the UE 120. For example, the measurement report may include a current location of the UE 120, such as a current altitude of the UE 120 and/or a horizontal location of the UE 120. In some aspects, the measurement report may include velocity information associated with the UE 120. For example, the measurement report may indicate a vertical velocity of the UE 120 and/or a horizontal velocity of the UE 120. In another example, the measurement report may indicate whether the UE 120 is in a rest mode (e.g., is not moving) or whether the UE 120 is in a moving mode.

In some aspects, the measurement report may include antenna related information. For example, the antenna related information may include an indication of whether a directional antenna associated with the UE 120 is in an on state or an off state. In some aspects, the measurement report may include beam related information. For example, the measurement report may indicate a direction of a main lobe of an antenna with respect to a local coordinate system. In some aspects, the measurement report may include main lobe information, such as a main lobe orientation (e.g., in elevation and azimuth), a main lobe beamwidth, and/or a main lobe directive gain. In some aspects, the measurement report may include side lobe information, such as a number of side lobes, a side lobe orientation, a side lobe gain, and/or information per side lobe. In some aspects, the antenna information may be indicated using one or more indices (e.g., 0 for an omni-directional antenna and 1 for a directional antenna) based at least in part on the UE 120 indicating the antenna capabilities of the UE 120 to the network node 110.

As described above, a UE 120 that does not cross an altitude threshold may not be configured to transmit a measurement report to the network node 110. This may result in the network node 110 not being able to perform beam management and/or the network node 110 not being able to report that the UE 120 has left a flight path. Using the techniques and apparatuses described herein, the UE 120 may transmit a measurement report, that includes an indication of the location of the UE 120 and/or the velocity of the UE 120, based at least in part on the altitude of the UE 120 being greater than an altitude threshold and at least one of an antenna condition or a flight path condition being satisfied. This may enable the network node 110 to receive accurate measurement reports from the UE 120, and to perform beam management and UE 120 location reporting more frequently, among other examples.

As indicated above, FIG. 6 is provided as an example. Other examples may differ from what is described with regard to FIG. 6.

Figure 7:
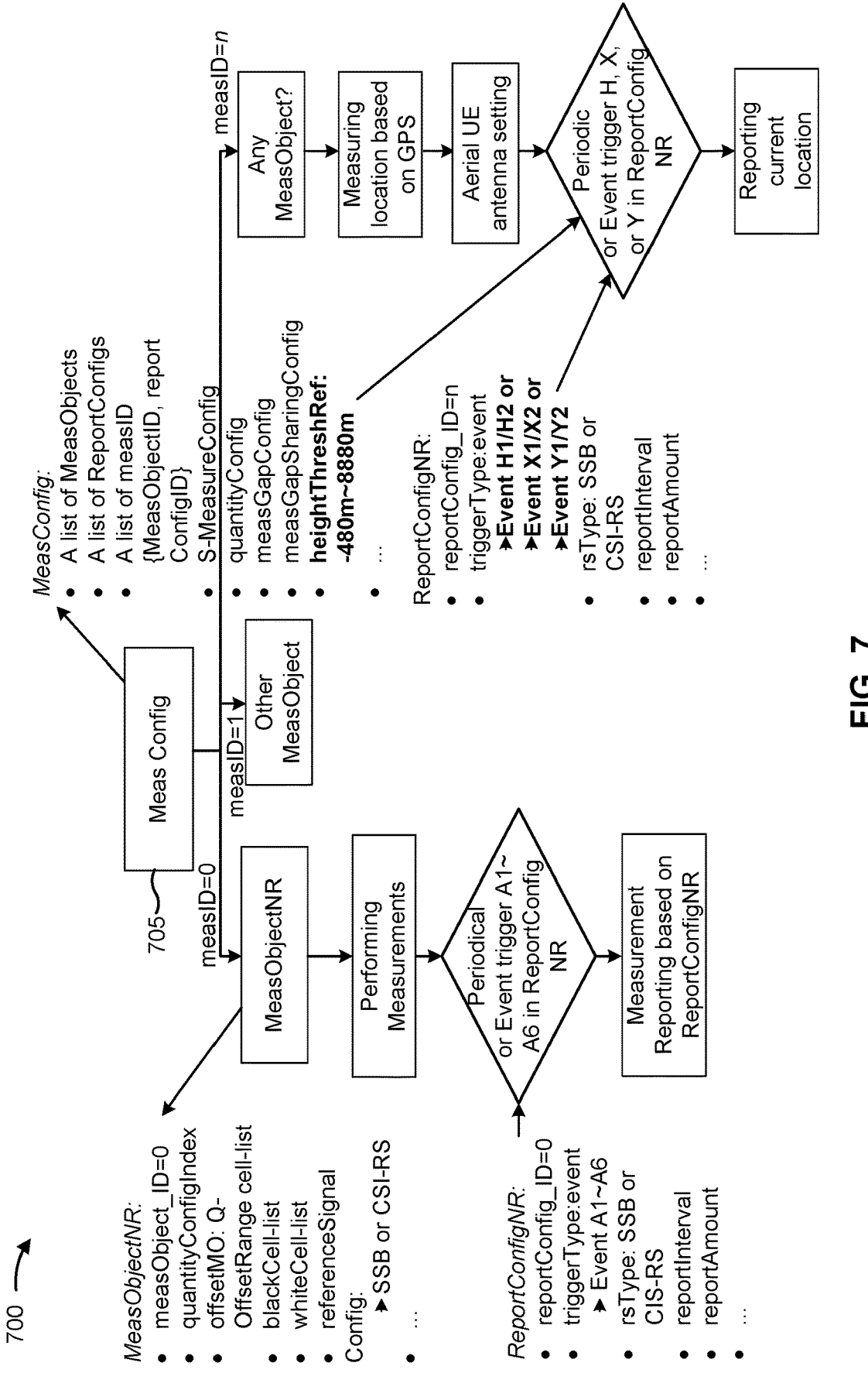
FIG. 7 is a diagram illustrating an example of a measurement and reporting configuration structure based at least in part on UE altitude, antenna configuration, and flight path, in accordance with the present disclosure.

FIG. 7 is a diagram illustrating an example 700 of a measurement and reporting configuration structure based at least in part on UE altitude, antenna configuration, and flight path, in accordance with the present disclosure.

In some aspects, the measurement and reporting configuration shown in FIG. 7 may be similar to the measurement and reporting configuration described in connection with FIG. 4. For example, the measurement configuration (MeasConfig) 705 may be similar to the measurement configuration (MeasConfig) 405. However, the measurement configuration 705 (MeasureObjectNR) (e.g., an NR measurement configuration) may include only some of the parameters associated with the measurement configuration MeasureObjectEUTRA 405 and/or may include one or more additional parameters that are not included in measurement configuration 405. In some aspects, the reporting configuration for NR (ReportConfigNR) may include only some of the parameters similar with the reporting configuration ReportConfigEUTRA and/or may include one or more additional parameters that are not included in the ReportConfigEUTRA. In some aspects, the trigger type indication (triggerType) associated with the ReportConfigNR may include an indication of the Event H1, the Event H2, the Event X1, the Event X2, the Event Y1, and the Event Y2. Thus, the trigger event may be satisfied based at least in part on an occurrence of any of the Event H1, the Event H2, the Event X1, the Event X2, the Event Y1, or the Event Y2. In some aspects, the measurement object (MeasObjectNR) associated with the measurement configuration 705 may include a reference signal configuration (referenceSignalConfig) that indicates whether the reference signal to be used is a synchronization signal block (SSB) or a channel state information reference signal (CSI-RS). Similarly, the reporting configuration (ReportConfigNR) associated with the measurement configuration 705 may include an indication of whether an SSB or a CSI-RS has been detected.

In some aspects, a measurement identity (measId) may be configured to associate with the measurement object identifier (measObjectId) and the reporting configuration identifier (reportConfigId). In some aspects, if the ReportConfigNR or the ReportConfigEUTRA is configured for the UE 120 location reporting, the UE 120 may not use the reference signals and other parameters configured in measurement object and the measObjectId may not be associated with the reportConfig in the measId. In some aspects, if the ReportConfigNR or the ReportConfigEUTRA is configured for the UE 120 location reporting, an invalid measObjectId may be associated with the reportConfig in the measId. In some aspects, if the ReportConfigNR or the ReportConfigEUTRA is configured for the UE 120 location reporting, the measObject may be associated with the reportConfig in the measId, but the UE 120 may ignore the unrelated fields in the measObject.

As indicated above, FIG. 7 is provided as an example. Other examples may differ from what is described with regard to FIG. 7.

Figure 8:
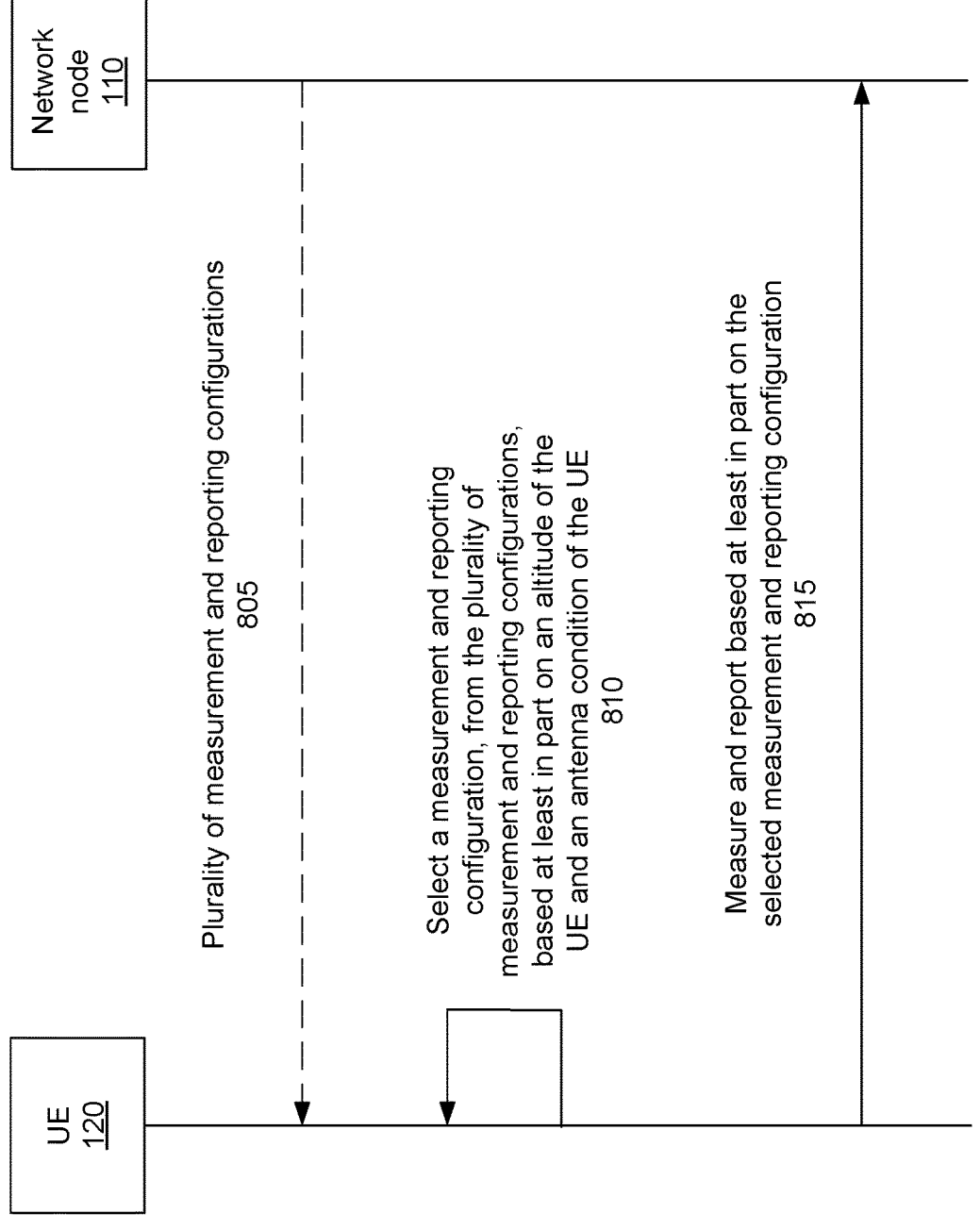
FIG. 8 is a diagram illustrating an example of UE measurement and reporting, in accordance with the present disclosure.

FIG. 8 is a diagram illustrating an example 800 of UE measurement and reporting, in accordance with the present disclosure. In some aspects, the UE 120 may detect different cells or SSBs based at least in part on an antenna configuration of the UE 120. The UE 120 may use different measurement and reporting configurations with different cell lists or SSB lists based at least in part on an altitude and antenna configuration of the UE 120.

As shown in connection with reference number 805, the UE 120 may obtain a plurality of measurement and reporting configurations. In some aspects, the network node 110 may transmit, and the UE 120 may receive, the plurality of measurement and reporting configurations. In some aspects, the UE 120 may be configured (e.g., pre-configured) with at least some of the plurality of measurement and reporting configurations, or at least a portion of one or more of the plurality of measurement and reporting configurations. In some aspects, the plurality of measurement and reporting configurations may indicate an altitude threshold. In some aspects, the plurality of measurement and reporting configurations may indicate one or more antenna conditions, such as an omni-directional antenna condition and a directional antenna condition. Additional details regarding these features are described below.

As shown in connection with reference number 810, the UE 120 may select a measurement and reporting configuration, from the plurality of measurement and reporting configurations, based at least in part on an altitude of the UE 120 and an antenna condition of the UE 120. In some aspects, the UE 120 may select a first measurement and reporting configuration based at least in part on the UE 120 being at a location that is below the altitude threshold. For example, the UE 120 may select the first measurement and reporting configuration based at least in part on the UE 120 being located on the ground (e.g., not in a flying state). In some aspects, the UE 120 may select a second measurement and reporting configuration based at least in part on the UE 120 being at a location that is greater than (or greater than or equal to) the altitude threshold and based at least in part on the UE 120 using a first antenna configuration. For example, the UE 120 may select the second measurement and reporting configuration based at least in part on the UE 120 being in the air (e.g., in a flying state) and based at least in part on the UE 120 using an omni-directional antenna. In some aspects, the UE 120 may select a third measurement and reporting configuration based at least in part on the UE 120 being at a location that is greater than (or greater than or equal to) the altitude threshold and based at least in part on the UE 120 using a second antenna configuration. For example, the UE 120 may select the third measurement and reporting configuration based at least in part on the UE 120 being in the air (e.g., in the flying state) and based at least in part on the UE 120 using a directional antenna. The first, second, and third measurement and reporting configurations are provided for example only. Other measurement and reporting configurations may be configured.

As shown in connection with reference number 815, the UE 120 may measure and report based at least in part on the selected measurement and reporting configuration. For example, the type and/or frequency of the measurement and reporting by the UE 120 may be based at least in part on the selected measurement and reporting configuration. Using the example above, based at least in part on the UE 120 selecting the first measurement and reporting configuration, the UE 120 may be configured not to perform measurement and reporting. Based at least in part on the UE 120 selecting the second measurement and reporting configuration, the UE 120 may be configured to measure using omni-directional antenna measurements and to report the omni-directional antenna measurements according to a first frequency. Based at least in part on the UE 120 selecting the third measurement and reporting configuration, the UE 120 may be configured to measure using directional antenna measurements and to report the directional antenna measurements according to a second frequency. The first frequency and the second frequency may be the same frequencies or may be different frequencies.

As indicated above, FIG. 8 is provided as an example. Other examples may differ from what is described with regard to FIG. 8.

Figure 9:
FIG. 9 is a diagram illustrating examples of UE antenna configurations, in accordance with the present disclosure.

FIG. 9 is a diagram illustrating examples 900 and 905 of UE antenna configurations, in accordance with the present disclosure. As described herein, the UE 120 may detect different cells or SSBs based at least in part on the antenna configuration of the UE 120. In this case, the UE 120 may use different measurement and reporting configurations with different cell lists or SSB lists based at least in part on the altitude and the antenna configuration of the UE 120. As shown in the example 900, the UE 120 may use one or more omni-directional antennas 910 for performing measurements. In this case, the UE 120 may detect cells and SSBs in all directions in accordance with the omni-directional antenna configuration. As shown in the example 905, the UE 120 may use one or more directional antennas 915 for performing measurements. In this case, the UE 120 may detect cells and SSBs in one or more particular directions in accordance with the directional antenna configuration. As described above in connection with FIG. 8, the UE 120 may perform measurement and reporting based at least in part on a selected measurement and reporting configuration. For example, based at least in part on the UE 120 using an omni-directional antenna configuration, the UE 120 may be configured to measure using the omni-directional antenna and to report the omni-directional antenna measurements according to a first frequency. In contrast, based at least in part on the UE 120 using a directional antenna configuration, the UE 120 may be configured to measure using the directional antenna and to report the directional antenna measurements according to a second frequency.

As indicated above, FIG. 9 is provided as an example. Other examples may differ from what is described with regard to FIG. 9.

Figure 10:
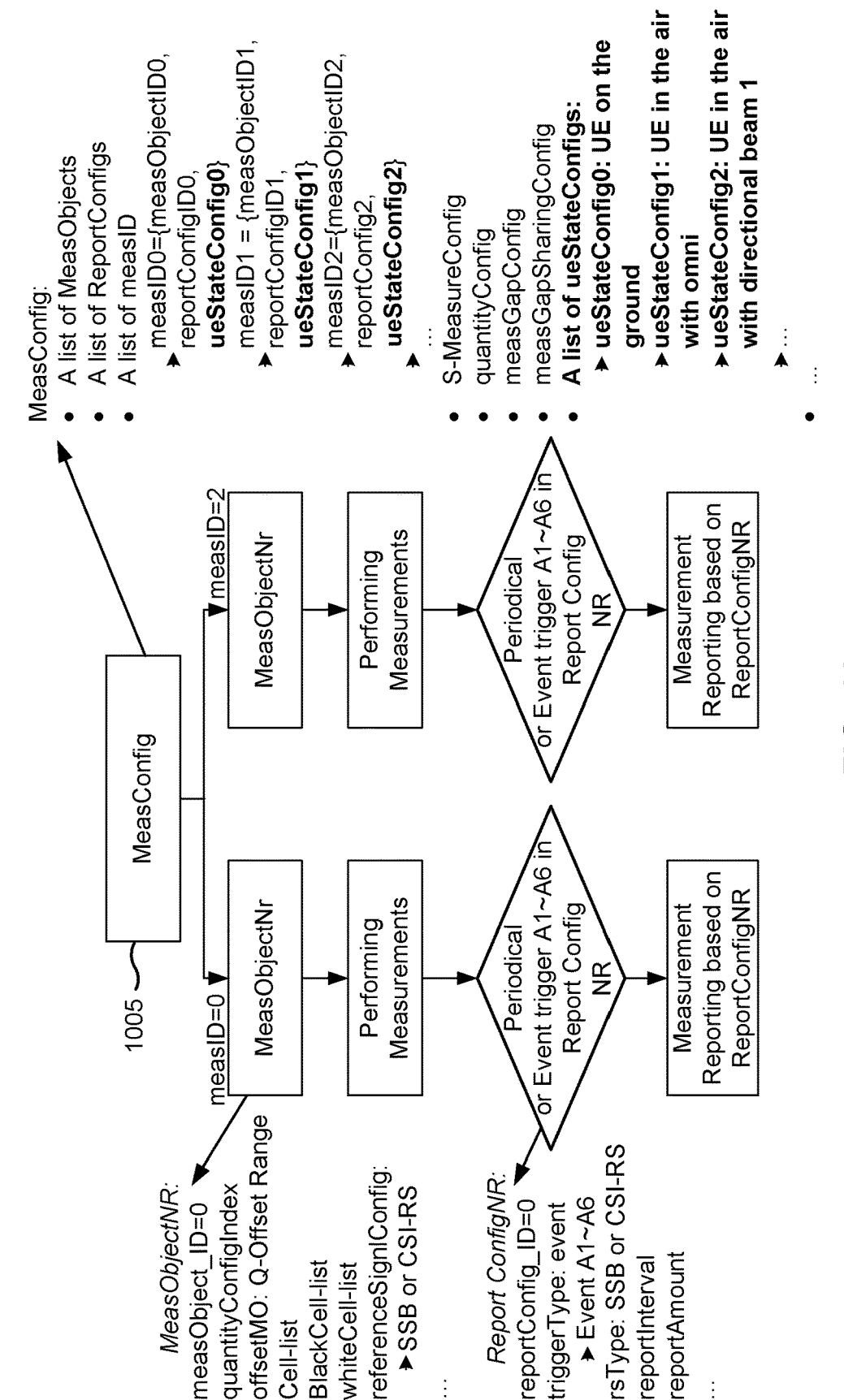
FIG. 10 is a diagram illustrating an example of a measurement and reporting configuration structure based at least in part on UE location and antenna configuration, in accordance with the present disclosure.

FIG. 10 is a diagram illustrating an example 1000 of a measurement and reporting configuration structure based at least in part on UE location and antenna configuration, in accordance with the present disclosure.

In some aspects, the measurement and reporting configuration shown in FIG. 10 may be similar to the measurement and reporting configuration described in connection with FIG. 4. For example, the measurement configuration (MeasConfig) 1005 may be similar to the measurement configuration (MeasConfig) 405. However, the measurement configuration 1005 may include only some of the parameters associated with the measurement configuration 405 and/or may include one or more additional parameters that are not associated with the measurement configuration 405. In some aspects, the list of measurement identities (measID) may include a first measurement identity (measID0={measObjectID0, reportConfigID0, ueStateConfig0}), a second measurement identity (measID1={measObjectID1, reportConfigID1, ueStateConfig1}), and a third measurement identity (measID2={measObjectID2, reportConfigID2, ueStateConfig2}). Additionally, or alternatively, the list of UE state configurations may include a first UE state configuration corresponding to the UE 120 being located on the ground (ueStateConfig0: UE on the ground), a second UE state configuration corresponding to the UE 120 being in the air and using an omni-directional antenna (ueStateConfig1: UE in the air with omni), and a third UE state configuration corresponding to the UE 120 being in the air and using a directional antenna (ueStateConfig2: UE in the air with directional beam 1). In some aspects, the measurement object (MeasObjectNR) associated with the measurement configuration 1005 may include a reference signal configuration (referenceSignalConfig) that indicates whether the reference signal being used is an SSB or a CSI-RS. Similarly, the reporting configuration (ReportConfigNR) associated with the measurement configuration 1005 may include the indication of whether an SSB or a CSI-RS has been detected.

As indicated above, FIG. 10 is provided as an example. Other examples may differ from what is described with regard to FIG. 10.

FIG. 11 is a diagram illustrating an example process 1100 performed, for example, by a UE, in accordance with the present disclosure. Example process 1100 is an example where the UE (e.g., UE 120) performs operations associated with UE measurement and reporting.

As shown in FIG. 11, in some aspects, process 1100 may include performing one or more measurements associated with an altitude of the UE (block 1110). For example, the UE (e.g., using communication manager 140 and/or measurement component 1508, depicted in FIG. 15) may perform one or more measurements associated with an altitude of the UE, as described above.

As further shown in FIG. 11, in some aspects, process 1100 may include obtaining an indication of an antenna condition or a flight path condition associated with the UE (block 1120). For example, the UE (e.g., using communication manager 140 and/or obtaining component 1510, depicted in FIG. 15) may obtain an indication of an antenna condition or a flight path condition associated with the UE, as described above.

As further shown in FIG. 11, in some aspects, process 1100 may include transmitting, based at least in part on the altitude of the UE being greater than an altitude threshold and at least one of the antenna condition or the flight path condition being satisfied, a measurement report that includes an indication of at least one of a vertical and/or horizontal location of the UE, or a rest mode or a moving mode of the UE (block 1130). For example, the UE (e.g., using communication manager 140 and/or transmission component 1504, depicted in FIG. 15) may transmit, based at least in part on the altitude of the UE being greater than an altitude threshold and at least one of the antenna condition or the flight path condition being satisfied, a measurement report that includes an indication of at least one of a location of the UE or a velocity of the UE, as described above.

Process 1100 may include additional aspects, such as any single aspect or any combination of aspects described below and/or in connection with one or more other processes described elsewhere herein.

In a first aspect, the antenna condition includes the UE switching between a directional antenna and an omni-directional antenna, and transmitting the measurement report comprises transmitting the measurement report based at least in part on the altitude of the UE being greater than the altitude threshold and based at least in part on the UE switching between the directional antenna and the omni-direction antenna.

In a second aspect, alone or in combination with the first aspect, switching between the directional antenna and the omni-directional antenna comprises switching from measuring using the directional antenna to measuring using the omni-directional antenna, or switching from measuring using the omni-directional antenna to measuring using the directional antenna.

In a third aspect, alone or in combination with one or more of the first and second aspects, the flight path condition includes the UE moving with respect to a reference location, and transmitting the measurement report comprises transmitting the measurement report based at least in part on the altitude of the UE being greater than the altitude threshold and based at least in part on the UE moving with respect to the reference location.

In a fourth aspect, alone or in combination with one or more of the first through third aspects, transmitting the measurement report based at least in part on the UE moving with respect to the reference location comprises transmitting the measurement report based at least in part on the UE moving within a distance of the reference location or transmitting the measurement report based at least in part on the UE moving outside of the distance from the reference location.

In a fifth aspect, alone or in combination with one or more of the first through fourth aspects, transmitting the measurement report that includes the indication of the location of the UE comprises transmitting a measurement report that includes at least one of an altitude of the UE or a horizontal location of the UE.

In a sixth aspect, alone or in combination with one or more of the first through fifth aspects, transmitting the measurement report that includes the indication of the velocity of the UE comprises transmitting a measurement report that includes at least one of a vertical velocity of the UE or a horizontal velocity of the UE.

In a seventh aspect, alone or in combination with one or more of the first through sixth aspects, transmitting the measurement report that includes the indication of the velocity of the UE comprises transmitting a measurement report that includes an indication of whether the UE is in a resting mode or whether the UE is in a moving mode.

In an eighth aspect, alone or in combination with one or more of the first through seventh aspects, transmitting the measurement report comprises transmitting an indication of whether a directional antenna associated with the UE is in an on state or an off state.

In a ninth aspect, alone or in combination with one or more of the first through eighth aspects, transmitting the measurement report comprises transmitting an indication of a beam condition.

In a tenth aspect, alone or in combination with one or more of the first through ninth aspects, the indication of the beam condition indicates at least one of a direction of a main lobe with respect to a local coordinate system, a main lobe orientation, a main lobe beamwidth, a main lobe directive gain, a number of side lobes, a side lobe orientation, a side lobe beamwidth, or a side lobe gain.

In an eleventh aspect, alone or in combination with one or more of the first through tenth aspects, performing the one or more measurements comprises performing the one or more measurements based at least in part on a synchronization signal block or a channel state information reference signal.

In a twelfth aspect, alone or in combination with one or more of the first through eleventh aspects, the measurement report is included in measurement and reporting configuration signaling between the UE and a network node.

In a thirteenth aspect, alone or in combination with one or more of the first through twelfth aspects, the UE is an unmanned aerial vehicle.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a UE, in accordance with the present disclosure. Example process 1200 is an example where the UE (e.g., UE 120) performs operations associated with UE measurement and reporting.

As shown in FIG. 12, in some aspects, process 1200 may include obtaining a plurality of measurement and reporting configurations (block 1210). For example, the UE (e.g., using communication manager 140 and/or obtaining component 1510, depicted in FIG. 15) may obtain a plurality of measurement and reporting configurations, as described above.

As further shown in FIG. 12, in some aspects, process 1200 may include selecting a measurement and reporting configuration, from the plurality of measurement and reporting configurations, based at least in part on an altitude of the UE and an antenna condition of the UE (block 1220). For example, the UE (e.g., using communication manager 140 and/or selection component 1514, depicted in FIG. 15) may select a measurement and reporting configuration, from the plurality of measurement and reporting configurations, based at least in part on an altitude of the UE and an antenna condition of the UE, as described above.

As further shown in FIG. 12, in some aspects, process 1200 may include measuring and reporting based at least in part on the selected measurement and reporting configuration (block 1230). For example, the UE (e.g., using communication manager 140 and/or measurement component 1508, depicted in FIG. 15) may measure and report based at least in part on the selected measurement and reporting configuration, as described above.

Process 1200 may include additional aspects, such as any single aspect or any combination of aspects described below and/or in connection with one or more other processes described elsewhere herein.

In a first aspect, the antenna condition is associated with the UE using a directional antenna or an omni-directional antenna.

In a second aspect, alone or in combination with the first aspect, selecting the measurement and reporting configuration based at least in part on the altitude of the UE and the antenna condition of the UE comprises selecting a first measurement and reporting configuration based at least in part on the altitude of the UE not satisfying an altitude threshold, selecting a second measurement and reporting configuration based at least in part on the altitude of the UE satisfying the altitude threshold and based at least in part on the antenna condition indicating that the UE is using a directional antenna, or selecting a third measurement and reporting configuration based at least in part on the altitude of the UE satisfying the altitude threshold and based at least in part on the antenna condition indicating that the UE is using an omni-directional antenna.

In a third aspect, alone or in combination with one or more of the first and second aspects, process 1200 includes transmitting, to a network node, an indication of the selected measurement and reporting configuration.

In a fourth aspect, alone or in combination with one or more of the first through third aspects, measuring and reporting based at least in part on the selected measurement and reporting configuration comprises performing one or more measurements associated with a synchronization signal block or a channel state information reference signal and transmitting a measurement report that includes an indication of the one or more measurements.

In a fifth aspect, alone or in combination with one or more of the first through fourth aspects, the measurement report is included in measurement and reporting configuration signaling between the UE and a network node.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a network node, in accordance with the present disclosure. Example process 1300 is an example where the network node (e.g., network node 110) performs operations associated with UE measurement and reporting.

As shown in FIG. 13, in some aspects, process 1300 may include transmitting, to a UE, a measurement and reporting configuration that includes an indication of an altitude threshold, an antenna condition, and a flight path condition (block 1310). For example, the network node (e.g., using communication manager 150 and/or transmission component 1604, depicted in FIG. 16) may transmit, to a UE, a measurement and reporting configuration that includes an indication of an altitude threshold, an antenna condition, and a flight path condition, as described above.

As further shown in FIG. 13, in some aspects, process 1300 may include receiving, from the UE, based at least in part on an altitude of the UE being greater than the altitude threshold and at least one of the antenna condition or the flight path condition being satisfied, a measurement report that is based at least in part on the measurement and reporting configuration and that includes an indication of at least one of a location of the UE or a velocity of the UE (block 1320). For example, the network node (e.g., using communication manager 150 and/or reception component 1602, depicted in FIG. 16) may receive, from the UE, based at least in part on an altitude of the UE being greater than the altitude threshold and at least one of the antenna condition or the flight path condition being satisfied, a measurement report that is based at least in part on the measurement and reporting configuration and that includes an indication of at least one of a location of the UE or a velocity of the UE, as described above.

Process 1300 may include additional aspects, such as any single aspect or any combination of aspects described below and/or in connection with one or more other processes described elsewhere herein.

In a first aspect, the antenna condition includes the UE switching between a directional antenna and an omni-directional antenna, and receiving the measurement report comprises receiving the measurement report based at least in part on the altitude of the UE being greater than the altitude threshold and based at least in part on the UE switching between the directional antenna and the omni-direction antenna.

In a second aspect, alone or in combination with the first aspect, the flight path condition includes the UE moving with respect to a reference location, and receiving the measurement report comprises receiving the measurement report based at least in part on the altitude of the UE being greater than the altitude threshold and based at least in part on the UE moving with respect to the reference location.

In a third aspect, alone or in combination with one or more of the first and second aspects, receiving the measurement report that includes the indication of the location of the UE comprises receiving a measurement report that includes at least one of an altitude of the UE or a horizontal location of the UE.

In a fourth aspect, alone or in combination with one or more of the first through third aspects, receiving the measurement report that includes the indication of the velocity of the UE comprises receiving a measurement report that includes at least one of a vertical velocity of the UE or a horizontal velocity of the UE.

In a fifth aspect, alone or in combination with one or more of the first through fourth aspects, receiving the measurement report that includes the indication of the velocity of the UE comprises receiving a measurement report that includes an indication of whether the UE is in a resting mode or whether the UE is in a moving mode.

In a sixth aspect, alone or in combination with one or more of the first through fifth aspects, receiving the measurement report comprises receiving an indication of whether a directional antenna associated with the UE is in an on state or an off state.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
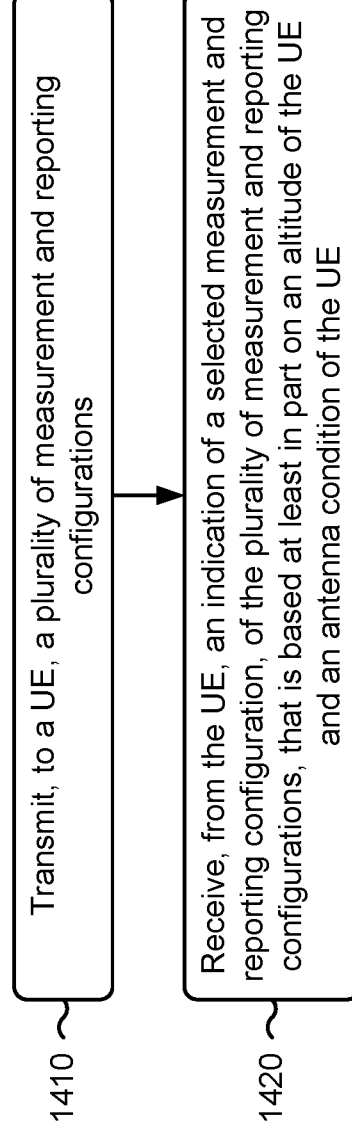
FIG. 14 is a diagram illustrating an example process performed, for example, by a network node, in accordance with the present disclosure.

FIG. 14 is a diagram illustrating an example process 1400 performed, for example, by a network node, in accordance with the present disclosure. Example process 1400 is an example where the network node (e.g., network node 110) performs operations associated with UE measurement and reporting.

As shown in FIG. 14, in some aspects, process 1400 may include transmitting, to a UE, a plurality of measurement and reporting configurations (block 1410). For example, the network node (e.g., using communication manager 150 and/or transmission component 1604, depicted in FIG. 16)

may transmit, to a UE, a plurality of measurement and reporting configurations, as described above.

As further shown in FIG. 14, in some aspects, process 1400 may include receiving, from the UE, an indication of a selected measurement and reporting configuration, of the plurality of measurement and reporting configurations, that is based at least in part on an altitude of the UE and an antenna condition of the UE (block 1420). For example, the network node (e.g., using communication manager 150 and/or reception component 1602, depicted in FIG. 16) may receive, from the UE, an indication of a selected measurement and reporting configuration, of the plurality of measurement and reporting configurations, that is based at least in part on an altitude of the UE and an antenna condition of the UE, as described above.

Process 1400 may include additional aspects, such as any single aspect or any combination of aspects described below and/or in connection with one or more other processes described elsewhere herein.

In a first aspect, the antenna condition is associated with the UE using a directional antenna or an omni-directional antenna.

In a second aspect, alone or in combination with the first aspect, receiving the indication of the selected measurement and reporting configuration comprises receiving an indication of a first selected measurement and reporting configuration based at least in part on the altitude of the UE not satisfying an altitude threshold, receiving an indication of a second selected measurement and reporting configuration based at least in part on the altitude of the UE satisfying the altitude threshold and based at least in part on the antenna condition indicating that the UE is using a directional antenna, or receiving an indication of a third selected measurement and reporting configuration based at least in part on the altitude of the UE satisfying the altitude threshold and based at least in part on the antenna condition indicating that the UE is using an omni-directional antenna.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
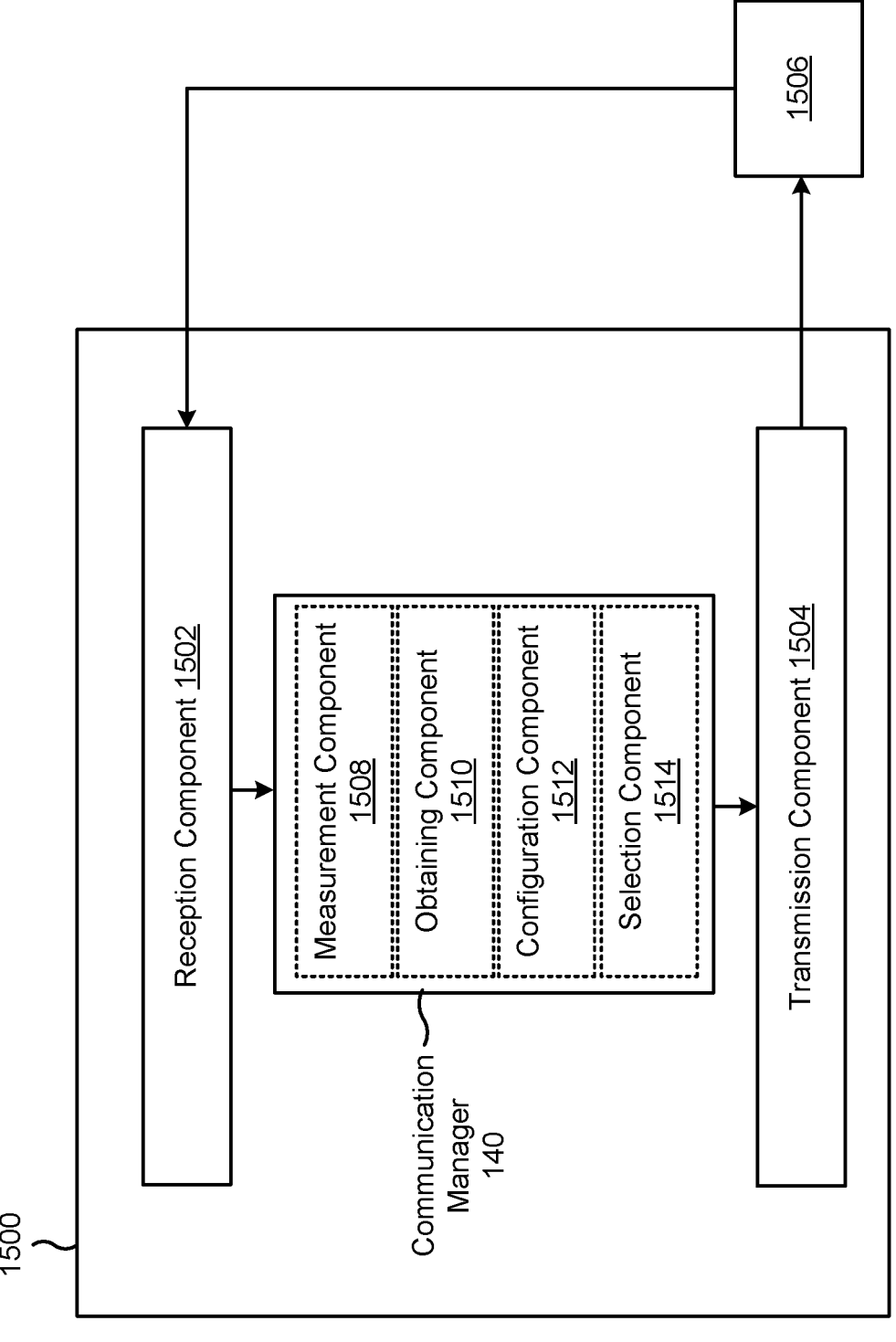
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include one or more of a measurement component 1508, an obtaining component 1510, a configuration component 1512, or a selection component 1514, among other examples.

In some aspects, the apparatus 1500 may be configured to perform one or more operations described herein in connection with FIGS. 6-10. Additionally, or alternatively, the apparatus 1500 may be configured to perform one or more processes described herein, such as process 1100 of FIG. 11, process 1200 of FIG. 12, or a combination thereof. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the UE described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE described in connection with FIG. 2. In some aspects, the transmission component 1504 may be co-located with the reception component 1502 in a transceiver.

The measurement component 1508 may perform one or more measurements associated with an altitude of the UE. The obtaining component 1510 may obtain an indication of an antenna condition or a flight path condition associated with the UE. The transmission component 1504 may transmit, based at least in part on the altitude of the UE being greater than an altitude threshold and at least one of the antenna condition or the flight path condition being satisfied, a measurement report that includes an indication of at least one of a location of the UE or a velocity of the UE.

The configuration component 1512 may obtain a plurality of measurement and reporting configurations. The selection component 1514 may select a measurement and reporting configuration, from the plurality of measurement and reporting configurations, based at least in part on an altitude of the UE and an antenna condition of the UE. The measurement component 1508 may measure and report based at least in part on the selected measurement and reporting configuration. The transmission component 1504 may transmit, to a network node, an indication of the selected measurement and reporting configuration.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
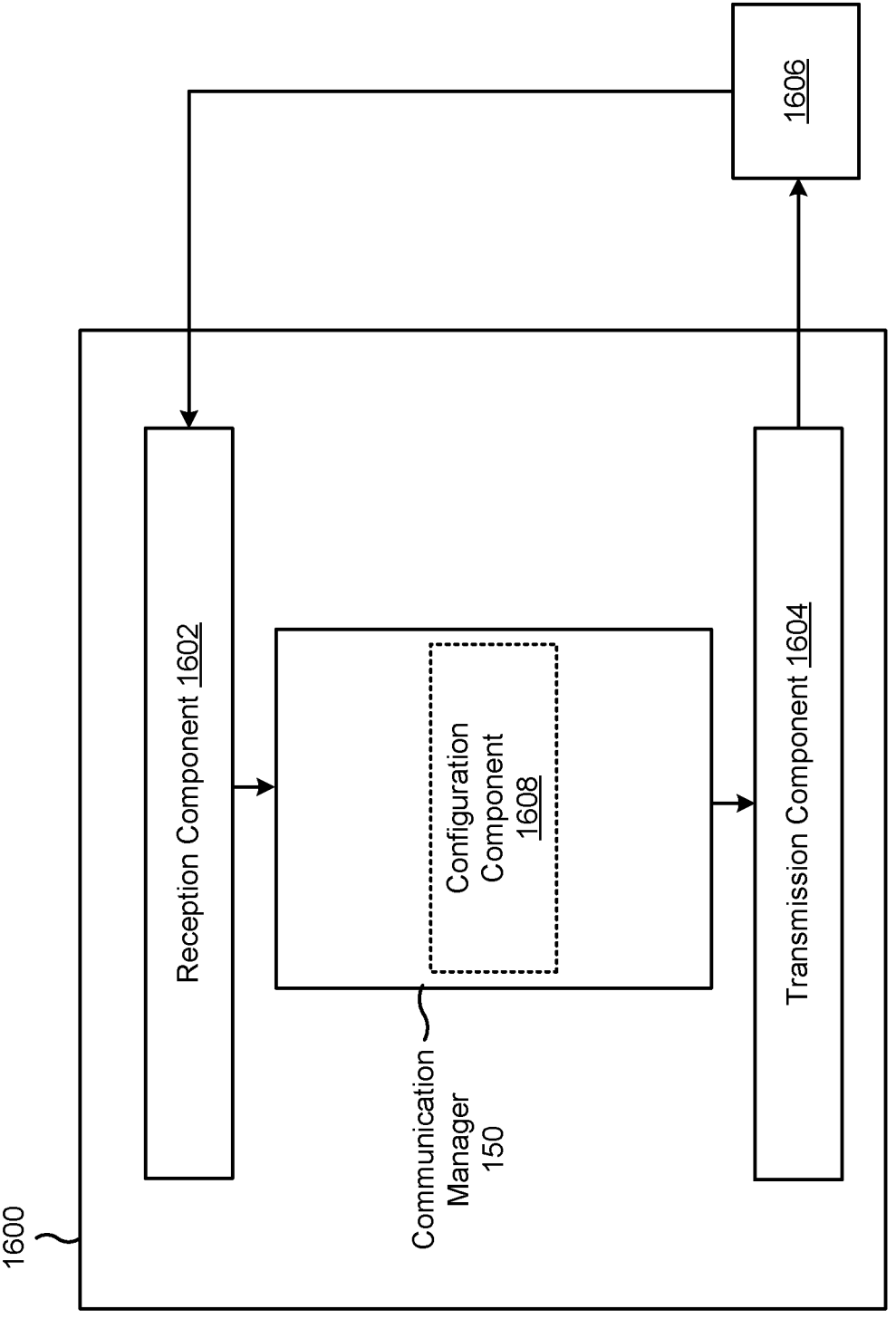
FIG. 16 is a diagram of an example apparatus for wireless communication, in accordance with the present disclosure.

FIG. 16 is a diagram of an example apparatus 1600 for wireless communication, in accordance with the present disclosure. The apparatus 1600 may be a network node, or a network node may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 150. The communication manager 150 may include a configuration component 1608, among other examples.

In some aspects, the apparatus 1600 may be configured to perform one or more operations described herein in connection with FIGS. 6-10. Additionally, or alternatively, the apparatus 1600 may be configured to perform one or more processes described herein, such as process 1300 of FIG. 13, process 1400 of FIG. 14, or a combination thereof. In some aspects, the apparatus 1600 and/or one or more components shown in FIG. 16 may include one or more components of the network node described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the network node described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the network node described in connection with FIG. 2. In some aspects, the transmission component 1604 may be co-located with the reception component 1602 in a transceiver.

The transmission component 1604 and/or the configuration component 1608 may transmit, to a UE, a measurement and reporting configuration that includes an indication of an altitude threshold, an antenna condition, and a flight path condition. The reception component 1602 may receive, from the UE, based at least in part on an altitude of the UE being greater than the altitude threshold and at least one of the antenna condition or the flight path condition being satisfied, a measurement report that is based at least in part on the measurement and reporting configuration and that includes an indication of at least one of a location of the UE or a velocity of the UE.

The transmission component 1604 and/or the configuration component 1608 may transmit, to a UE, a plurality of measurement and reporting configurations. The reception component 1602 may receive, from the UE, an indication of a selected measurement and reporting configuration, of the plurality of measurement and reporting configurations, that is based at least in part on an altitude of the UE and an antenna condition of the UE.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a user equipment (UE), comprising: performing one or more measurements associated with an altitude of the UE; obtaining an indication of an antenna condition or a flight path condition associated with the UE; and transmitting, based at least in part on the altitude of the UE being greater than an altitude threshold and at least one of the antenna condition or the flight path condition being satisfied, a measurement report that includes an indication of at least one of a location of the UE or a velocity of the UE.

Aspect 2: The method of Aspect 1, wherein the antenna condition includes the UE switching between a directional antenna and an omni-directional antenna, and wherein transmitting the measurement report comprises transmitting the measurement report based at least in part on the altitude of the UE being greater than the altitude threshold and based at least in part on the UE switching between the directional antenna and the omni-direction antenna.

Aspect 3: The method of Aspect 2, wherein switching between the directional antenna and the omni-directional antenna comprises switching from measuring using the directional antenna to measuring using the omni-directional antenna, or switching from measuring using the omni-directional antenna to measuring using the directional antenna.

Aspect 4: The method of any of Aspects 1-3, wherein the flight path condition includes the UE moving with respect to a reference location, and wherein transmitting the measurement report comprises transmitting the measurement report based at least in part on the altitude of the UE being greater than the altitude threshold and based at least in part on the UE moving with respect to the reference location.

Aspect 5: The method of Aspect 4, wherein transmitting the measurement report based at least in part on the UE moving with respect to the reference location comprises transmitting the measurement report based at least in part on the UE moving within a distance of the reference location or transmitting the measurement report based at least in part on the UE moving outside of the distance from the reference location.

Aspect 6: The method of any of Aspects 1-5, wherein transmitting the measurement report that includes the indication of the location of the UE comprises transmitting a measurement report that includes at least one of an altitude of the UE or a horizontal location of the UE.

Aspect 7: The method of any of Aspects 1-6, wherein transmitting the measurement report that includes the indication of the velocity of the UE comprises transmitting a measurement report that includes at least one of a vertical velocity of the UE or a horizontal velocity of the UE.

Aspect 8: The method of any of Aspects 1-7, wherein transmitting the measurement report that includes the indication of the velocity of the UE comprises transmitting a measurement report that includes an indication of whether the UE is in a resting mode or whether the UE is in a moving mode.

Aspect 9: The method of any of Aspects 1-8, wherein transmitting the measurement report comprises transmitting an indication of whether a directional antenna associated with the UE is in an on state or an off state.

Aspect 10: The method of any of Aspects 1-9, wherein transmitting the measurement report comprises transmitting an indication of a beam condition.

Aspect 11: The method of Aspect 10, wherein the indication of the beam condition indicates at least one of a direction of a main lobe with respect to a local coordinate system, a main lobe orientation, a main lobe beamwidth, a main lobe directive gain, a number of side lobes, a side lobe orientation, a side lobe beamwidth, or a side lobe gain.

Aspect 12: The method of any of Aspects 1-11, wherein performing the one or more measurements comprises performing the one or more measurements based at least in part on a synchronization signal block or a channel state information reference signal.

Aspect 13: The method of any of Aspects 1-12, wherein the measurement report is included in measurement and reporting configuration signaling between the UE and a network node.

Aspect 14: The method of any of Aspects 1-13, wherein the UE is an unmanned aerial vehicle.

Aspect 15: A method of wireless communication performed by a user equipment (UE), comprising: obtaining a plurality of measurement and reporting configurations; selecting a measurement and reporting configuration, from the plurality of measurement and reporting configurations, based at least in part on an altitude of the UE and an antenna condition of the UE; and measuring and reporting based at least in part on the selected measurement and reporting configuration.

Aspect 16: The method of Aspect 15, wherein the antenna condition is associated with the UE using a directional antenna or an omni-directional antenna.

Aspect 17: The method of any of Aspects 15-16, wherein selecting the measurement and reporting configuration based at least in part on the altitude of the UE and the antenna condition of the UE comprises: selecting a first measurement and reporting configuration based at least in part on the altitude of the UE not satisfying an altitude threshold; selecting a second measurement and reporting configuration based at least in part on the altitude of the UE satisfying the altitude threshold and based at least in part on the antenna condition indicating that the UE is using a directional antenna; or selecting a third measurement and reporting configuration based at least in part on the altitude of the UE satisfying the altitude threshold and based at least in part on the antenna condition indicating that the UE is using an omni-directional antenna.

Aspect 18: The method of any of Aspects 15-17, further comprising transmitting, to a network node, an indication of the selected measurement and reporting configuration.

Aspect 19: The method of any of Aspects 15-18, wherein measuring and reporting based at least in part on the selected measurement and reporting configuration comprises performing one or more measurements associated with a synchronization signal block or a channel state information reference signal and transmitting a measurement report that includes an indication of the one or more measurements.

Aspect 20: The method of Aspect 19, wherein the measurement report is included in measurement and reporting configuration signaling between the UE and a network node.

Aspect 21: A method of wireless communication performed by a network node, comprising: transmitting, to a user equipment (UE), a measurement and reporting configuration that includes an indication of an altitude threshold, an antenna condition, and a flight path condition; and receiving, from the UE, based at least in part on an altitude of the UE being greater than the altitude threshold and at least one of the antenna condition or the flight path condition being satisfied, a measurement report that is based at least in part on the measurement and reporting configuration and that includes an indication of at least one of a location of the UE or a velocity of the UE.

Aspect 22: The method of Aspect 21, wherein the antenna condition includes the UE switching between a directional antenna and an omni-directional antenna, and wherein receiving the measurement report comprises receiving the measurement report based at least in part on the altitude of the UE being greater than the altitude threshold and based at least in part on the UE switching between the directional antenna and the omni-direction antenna.

Aspect 23: The method of any of Aspects 21-22, wherein the flight path condition includes the UE moving with respect to a reference location, and wherein receiving the measurement report comprises receiving the measurement report based at least in part on the altitude of the UE being greater than the altitude threshold and based at least in part on the UE moving with respect to the reference location.

Aspect 24: The method of any of Aspects 21-23, wherein receiving the measurement report that includes the indication of the location of the UE comprises receiving a measurement report that includes at least one of an altitude of the UE or a horizontal location of the UE.

Aspect 25: The method of any of Aspects 21-24, wherein receiving the measurement report that includes the indication of the velocity of the UE comprises receiving a measurement report that includes at least one of a vertical velocity of the UE or a horizontal velocity of the UE.

Aspect 26: The method of any of Aspects 21-25, wherein receiving the measurement report that includes the indication of the velocity of the UE comprises receiving a measurement report that includes an indication of whether the UE is in a resting mode or whether the UE is in a moving mode.

Aspect 27: The method of any of Aspects 21-26, wherein receiving the measurement report comprises receiving an indication of whether a directional antenna associated with the UE is in an on state or an off state.

Aspect 28: A method of wireless communication performed by a network node, comprising: transmitting, to a user equipment (UE), a plurality of measurement and reporting configurations; and receiving, from the UE, an indication of a selected measurement and reporting configuration, of the plurality of measurement and reporting configurations, that is based at least in part on an altitude of the UE and an antenna condition of the UE.

Aspect 29: The method of Aspect 28, wherein the antenna condition is associated with the UE using a directional antenna or an omni-directional antenna.

Aspect 30: The method of any of Aspects 29-30, wherein receiving the indication of the selected measurement and reporting configuration comprises: receiving an indication of a first selected measurement and reporting configuration based at least in part on the altitude of the UE not satisfying an altitude threshold; receiving an indication of a second selected measurement and reporting configuration based at least in part on the altitude of the UE satisfying the altitude threshold and based at least in part on the antenna condition indicating that the UE is using a directional antenna; or receiving an indication of a third selected measurement and reporting configuration based at least in part on the altitude of the UE satisfying the altitude threshold and based at least in part on the antenna condition indicating that the UE is using an omni-directional antenna.

Aspect 31: An apparatus for wireless communication at a device, comprising a processor; memory coupled with the processor; and instructions stored in the memory and executable by the processor to cause the apparatus to perform the method of one or more of Aspects 1-14.

Aspect 32: A device for wireless communication, comprising a memory and one or more processors coupled to the memory, the one or more processors configured to perform the method of one or more of Aspects 1-14.

Aspect 33: An apparatus for wireless communication, comprising at least one means for performing the method of one or more of Aspects 1-14.

Aspect 34: A non-transitory computer-readable medium storing code for wireless communication, the code comprising instructions executable by a processor to perform the method of one or more of Aspects 1-14.

Aspect 35: A non-transitory computer-readable medium storing a set of instructions for wireless communication, the set of instructions comprising one or more instructions that, when executed by one or more processors of a device, cause the device to perform the method of one or more of Aspects 1-14.

Aspect 36: An apparatus for wireless communication at a device, comprising a processor; memory coupled with the processor; and instructions stored in the memory and executable by the processor to cause the apparatus to perform the method of one or more of Aspects 15-20.

Aspect 37: A device for wireless communication, comprising a memory and one or more processors coupled to the memory, the one or more processors configured to perform the method of one or more of Aspects 15-20.

Aspect 38: An apparatus for wireless communication, comprising at least one means for performing the method of one or more of Aspects 15-20.

Aspect 39: A non-transitory computer-readable medium storing code for wireless communication, the code comprising instructions executable by a processor to perform the method of one or more of Aspects 15-20.

Aspect 40: A non-transitory computer-readable medium storing a set of instructions for wireless communication, the set of instructions comprising one or more instructions that, when executed by one or more processors of a device, cause the device to perform the method of one or more of Aspects 15-20.

Aspect 41: An apparatus for wireless communication at a device, comprising a processor; memory coupled with the processor; and instructions stored in the memory and executable by the processor to cause the apparatus to perform the method of one or more of Aspects 21-27.

Aspect 42: A device for wireless communication, comprising a memory and one or more processors coupled to the memory, the one or more processors configured to perform the method of one or more of Aspects 21-27.

Aspect 43: An apparatus for wireless communication, comprising at least one means for performing the method of one or more of Aspects 21-27.

Aspect 44: A non-transitory computer-readable medium storing code for wireless communication, the code comprising instructions executable by a processor to perform the method of one or more of Aspects 21-27.

Aspect 45: A non-transitory computer-readable medium storing a set of instructions for wireless communication, the set of instructions comprising one or more instructions that, when executed by one or more processors of a device, cause the device to perform the method of one or more of Aspects 21-27.

Aspect 46: An apparatus for wireless communication at a device, comprising a processor; memory coupled with the processor; and instructions stored in the memory and executable by the processor to cause the apparatus to perform the method of one or more of Aspects 28-30.

Aspect 47: A device for wireless communication, comprising a memory and one or more processors coupled to the memory, the one or more processors configured to perform the method of one or more of Aspects 28-30.

Aspect 48: An apparatus for wireless communication, comprising at least one means for performing the method of one or more of Aspects 28-30.

Aspect 49: A non-transitory computer-readable medium storing code for wireless communication, the code comprising instructions executable by a processor to perform the method of one or more of Aspects 28-30.

Aspect 50: A non-transitory computer-readable medium storing a set of instructions for wireless communication, the set of instructions comprising one or more instructions that, when executed by one or more processors of a device, cause the device to perform the method of one or more of Aspects 28-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors, coupled to the one or more memories, configured to:

obtain a plurality of measurement and reporting configurations, a selection of a first measurement and reporting configuration of the plurality of measurement and reporting configurations being associated with an altitude of the UE being below an altitude threshold, and a selection of a second measurement and reporting configuration of the plurality of measurement and reporting configurations being associated with the altitude of the UE being greater than or equal to the altitude threshold;

perform, according to the second measurement and reporting configuration and based at least in part on the altitude of the UE being greater than or equal to the altitude threshold, one or more measurements associated with the altitude of the UE;

obtain an indication of an antenna condition or a flight path condition associated with the UE; and transmit, based at least in part on the altitude of the UE being greater than or equal to the altitude threshold, a measurement report that includes an indication of the altitude of the UE and at least one of a location of the UE or a velocity of the UE.

2. The apparatus of claim 1, wherein the antenna condition includes the UE switching between a directional antenna and an omni-directional antenna, and wherein transmitting the measurement report comprises transmitting the measurement report based at least in part on the altitude of the UE being greater than the altitude threshold and based at least in part on the UE switching between the directional antenna and the omni-direction antenna.

3. The apparatus of claim 2, wherein the one or more processors, to switch between the directional antenna and the omni-directional antenna, are configured to switch from measuring using the directional antenna to measuring using the omni-directional antenna, or switching from measuring using the omni-directional antenna to measuring using the directional antenna.

4. The apparatus of claim 1, wherein the flight path condition includes the UE moving with respect to a reference location, and wherein transmitting the measurement report comprises transmitting the measurement report based at least in part on the altitude of the UE being greater than the altitude threshold and based at least in part on the UE moving with respect to the reference location.

5. The apparatus of claim 4, wherein the one or more processors, to transmit the measurement report based at least in part on the UE moving with respect to the reference location, are configured to transmit the measurement report based at least in part on the UE moving within a distance of the reference location or transmit the measurement report based at least in part on the UE moving outside of the distance from the reference location.

6. The apparatus of claim 1, wherein the one or more processors, to transmit the measurement report, are configured to transmit a measurement report that further includes a horizontal location of the UE.

7. The apparatus of claim 1, wherein the one or more processors, to transmit the measurement report, are configured to transmit a measurement report that includes at least one of a vertical velocity of the UE or a horizontal velocity of the UE.

8. The apparatus of claim 1, wherein the one or more processors, to transmit the measurement report, are configured to transmit a measurement report that includes an indication of whether the UE is in a resting mode or whether the UE is in a moving mode.

9. The apparatus of claim 1, wherein the one or more processors, to transmit the measurement report, are configured to transmit an indication of whether a directional antenna associated with the UE is in an on state or an off state.

10. The apparatus of claim 1, wherein the one or more processors, to transmit the measurement report, are configured to transmit an indication of a beam condition.

11. The apparatus of claim 10, wherein the indication of the beam condition indicates at least one of a direction of a main lobe with respect to a local coordinate system, a main lobe orientation, a main lobe beamwidth, a main lobe directive gain, a number of side lobes, a side lobe orientation, a side lobe beamwidth, or a side lobe gain.

12. The apparatus of claim 1, wherein the one or more processors, to perform the one or more measurements, are configured to perform the one or more measurements based at least in part on a synchronization signal block or a channel state information reference signal.

13. The apparatus of claim 1, wherein the measurement report is included in measurement and reporting configuration signaling between the UE and a network node.

14. The apparatus of claim 1, wherein the UE is an unmanned aerial vehicle.

15. An apparatus for wireless communication at a user equipment (UE), comprising:
one or more memories; and
one or more processors, coupled to the one or more memories, configured to:
obtain a plurality of measurement and reporting configurations;
select a measurement and reporting configuration, from the plurality of measurement and reporting configurations, based at least in part on an altitude of the UE, the plurality of measurement and reporting configurations including at least a first measurement and reporting configuration associated with the altitude of the UE being below an altitude threshold and a second measurement and reporting configuration associated with the altitude of the UE being greater than or equal to the altitude threshold; and measure and report based at least in part on the selected measurement and reporting configuration, the measurement and reporting configuration identifying that the UE is to include an indication of the altitude of the UE in a measurement report.

16. The apparatus of claim 15, wherein an antenna condition is associated with the UE using a directional antenna or an omni-directional antenna.

17. The apparatus of claim 15, wherein the one or more processors, to select the measurement and reporting configuration based at least in part on the altitude of the UE, are configured to:
select a first measurement and reporting configuration based at least in part on the altitude of the UE not satisfying an altitude threshold;
select a second measurement and reporting configuration based at least in part on the altitude of the UE satisfying the altitude threshold and based at least in part on an antenna condition indicating that the UE is using a directional antenna; or
select a third measurement and reporting configuration based at least in part on the altitude of the UE satisfying the altitude threshold and based at least in part on an antenna condition indicating that the UE is using an omni-directional antenna.

18. The apparatus of claim 15, wherein the one or more processors are further configured to transmit, to a network node, an indication of the selected measurement and reporting configuration.

19. The apparatus of claim 15, wherein the one or more processors, to measure and report based at least in part on the selected measurement and reporting configuration, are configured to perform one or more measurements associated with a synchronization signal block or a channel state information reference signal and transmit a measurement report that includes an indication of the one or more measurements.

20. The apparatus of claim 19, wherein the measurement report is included in measurement and reporting configuration signaling between the UE and a network node.

21. An apparatus for wireless communication at a network node, comprising:
one or more memories; and
one or more processors, coupled to the one or more memories, configured to:
transmit, to a user equipment (UE), a first measurement and reporting configuration;
transmit, to the UE, a second measurement and reporting configuration that includes an indication of an altitude threshold, an antenna condition, and a flight path condition, the first measurement and reporting configuration being associated with an altitude of the UE not satisfying the altitude threshold, and the second measurement and reporting configuration being associated with the altitude of the UE being greater than the altitude threshold; and
receive, from the UE, based at least in part on the altitude of the UE being greater than the altitude threshold, a measurement report that is based at least in part on the second measurement and reporting configuration and that includes an indication of the altitude of the UE and at least one of a location of the UE or a velocity of the UE.

22. The apparatus of claim 21,
wherein the antenna condition includes the UE switching between a directional antenna and an omni-directional antenna, and wherein receiving the measurement report comprises receiving the measurement report based at least in part on the altitude of the UE being greater than the altitude threshold and based at least in part on the UE switching between the directional antenna and the omni-direction antenna.

23. The apparatus of claim 21,
wherein the flight path condition includes the UE moving with respect to a reference location, and wherein receiving the measurement report comprises receiving the measurement report based at least in part on the altitude of the UE being greater than the altitude threshold and based at least in part on the UE moving with respect to the reference location.

24. The apparatus of claim 21,
wherein the one or more processors, to receive the measurement report, are configured to receive a measurement report that further includes a horizontal location of the UE.

25. The apparatus of claim 21,
wherein the one or more processors, to receive the measurement report, are configured to receive a measurement report that includes at least one of a vertical velocity of the UE or a horizontal velocity of the UE.

26. The apparatus of claim 21,
wherein the one or more processors, to receive the measurement report, are configured to receive a measurement report that includes an indication of whether the UE is in a resting mode or whether the UE is in a moving mode.

27. The apparatus of claim 21,
wherein the one or more processors, to receive the measurement report, are configured to receive an indication of whether a directional antenna associated with the UE is in an on state or an off state.

28. An apparatus for wireless communication at a network node, comprising:
one or more memories; and
one or more processors, coupled to the one or more memories, configured to:

transmit, to a user equipment (UE), a plurality of measurement and reporting configurations, the plurality of measurement and reporting configurations including at least a first measurement and reporting configuration associated with an altitude of the UE being below an altitude threshold and a second measurement and reporting configuration associated with the altitude of the UE being greater than or equal to the altitude threshold; and
receive, from the UE, an indication of a selected measurement and reporting configuration, of the plurality of measurement and reporting configurations, that is based at least in part on the altitude of the UE and an antenna condition of the UE, the measurement and reporting configuration identifying that the UE is to include an indication of the altitude of the UE in a measurement report.

29. The apparatus of claim 28,
wherein the antenna condition is associated with the UE using a directional antenna or an omni-directional antenna.

30. The apparatus of claim 28,
wherein the one or more processors, to receive the indication of the selected measurement and reporting configuration, are configured to:
receive an indication of a first selected measurement and reporting configuration based at least in part on the altitude of the UE not satisfying an altitude threshold;
receive an indication of a second selected measurement and reporting configuration based at least in part on the altitude of the UE satisfying the altitude threshold and based at least in part on the antenna condition indicating that the UE is using a directional antenna; or
receive an indication of a third selected measurement and reporting configuration based at least in part on the altitude of the UE satisfying the altitude threshold and based at least in part on the antenna condition indicating that the UE is using an omni-directional antenna.

* * * * *